United States Patent
Nakagami

(10) Patent No.: US 11,140,400 B2
(45) Date of Patent: Oct. 5, 2021

(54) IMAGE PROCESSING APPARATUS AND IMAGE PROCESSING METHOD FOR INTRA BC PREDICTION

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/575,836

(22) PCT Filed: May 25, 2016

(86) PCT No.: PCT/JP2016/065390
§ 371 (c)(1),
(2) Date: Nov. 21, 2017

(87) PCT Pub. No.: WO2016/194721
PCT Pub. Date: Dec. 8, 2016

(65) Prior Publication Data
US 2018/0124411 A1    May 3, 2018

(30) Foreign Application Priority Data

Jun. 5, 2015  (JP) .............................. JP2015-114915

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/105* (2014.11); *H04N 19/115* (2014.11);
(Continued)

(58) Field of Classification Search
CPC .. H04N 19/105; H04N 19/115; H04N 19/117; H04N 19/159; H04N 19/167;
(Continued)

(56) References Cited

U.S. PATENT DOCUMENTS

2014/0198844 A1* 7/2014 Hsu .................... H04N 19/70
                                                  375/240.07
2014/0376634 A1* 12/2014 Guo .................... H04N 19/176
                                                  375/240.16
(Continued)

FOREIGN PATENT DOCUMENTS

AU    2014281331 A1    2/2016
AU    2013403224 A1    3/2016
(Continued)

OTHER PUBLICATIONS

Boyce, et al., "Draft High Efficiency Video Coding (HEVC) Version 2, Combined Format Range Extensions (Rext), Scalability (SHVC), and Multi-View (MV-HEVC) Extensions", Joint Collaborative Team on Video Coding (JCT-VC) of ITU-TSG 16 WP 3 and ISO/IEC JTC 1/SC 29/WG 11, JCTVC-R1013_v6, 18th Meeting: Sapporo JP, Jun. 30-Jul. 9, 2014, 535 pages.
(Continued)

*Primary Examiner* — Jessica M Prince
(74) *Attorney, Agent, or Firm* — Chip Law Group

(57) ABSTRACT

An image processing apparatus and an image processing method are provided to reduce a processing load in performing intra BC prediction utilizing correlativity in a screen. A limiting unit limits a motion vector of a current block to be used for the intra BC prediction utilizing the correlativity in the screen, in such a manner that a peripheral pixel of the current block is not used for the intra BC prediction of the current block. An encoding apparatus or the like is provided that performs the intra BC prediction when encoding on a CU (Coding Unit)-by-CU basis in compliance with an HEVC (High Efficiency Video Coding) system, for example.

4 Claims, 16 Drawing Sheets

(51) Int. Cl.
  *H04N 19/105* (2014.01)
  *H04N 19/57* (2014.01)
  *H04N 19/593* (2014.01)
  *H04N 19/115* (2014.01)
  *H04N 19/167* (2014.01)
  *H04N 19/513* (2014.01)
  *H04N 19/117* (2014.01)

(52) U.S. Cl.
  CPC ......... *H04N 19/167* (2014.11); *H04N 19/176* (2014.11); *H04N 19/513* (2014.11); *H04N 19/57* (2014.11); *H04N 19/593* (2014.11); *H04N 19/117* (2014.11)

(58) Field of Classification Search
  CPC .... H04N 19/176; H04N 19/513; H04N 19/57; H04N 19/593
  See application file for complete search history.

(56) References Cited

U.S. PATENT DOCUMENTS

| | | | |
|---|---|---|---|
| 2015/0071357 A1* | 3/2015 | Pang | H04N 19/563 375/240.16 |
| 2015/0229945 A1 | 8/2015 | Nakagami et al. | |
| 2015/0256844 A1 | 9/2015 | Ikai et al. | |
| 2015/0271517 A1* | 9/2015 | Pang | H04N 19/57 375/240.02 |
| 2016/0105682 A1* | 4/2016 | Rapaka | H04N 19/50 375/240.12 |
| 2016/0241868 A1 | 8/2016 | Li et al. | |
| 2016/0241880 A1* | 8/2016 | Chao | H04N 19/86 |
| 2017/0238001 A1* | 8/2017 | Li | H04N 19/11 375/240.12 |
| 2017/0289566 A1* | 10/2017 | He | H04N 19/52 |

FOREIGN PATENT DOCUMENTS

| | | |
|---|---|---|
| BR | 112015032150 A2 | 7/2017 |
| BR | 112016007151 A2 | 9/2017 |
| CA | 2912447 A1 | 12/2014 |
| CA | 2924763 A1 | 4/2015 |
| CA | 2928495 A1 | 4/2015 |
| CN | 104685881 A | 6/2015 |
| CN | 105393536 A | 3/2016 |
| CN | 105765974 A | 7/2016 |
| EP | 2899984 A1 | 7/2015 |
| EP | 2903285 A1 | 8/2015 |
| EP | 3011743 A2 | 4/2016 |
| EP | 3058739 A1 | 8/2016 |
| HK | 1216961 A1 | 12/2016 |
| JP | 6359101 B2 | 7/2018 |
| JP | 6377734 B2 | 8/2018 |
| KR | 10-2015-0067142 A | 6/2015 |
| KR | 10-2016-0023729 A | 3/2016 |
| KR | 10-2016-0072181 A | 6/2016 |
| PH | 12015502805 A1 | 3/2016 |
| RU | 2015154500 A | 7/2017 |
| RU | 2016114182 A | 10/2017 |
| SG | 11201509469T A | 1/2016 |
| SG | 10201710379S A | 1/2018 |
| WO | 2013/060250 A1 | 5/2013 |
| WO | 2014/050695 A1 | 4/2014 |
| WO | 2014/050948 A1 | 4/2014 |
| WO | 2014/205339 A2 | 12/2014 |
| WO | 2015/054811 A1 | 4/2015 |

OTHER PUBLICATIONS

Joshi, et al., "High Efficiency Video Coding (HEVC) Screen Content Coding: Draft 3", Joint Collaborative Team on Video Coding (JCT-VC) of ITU-T SG 16 WP 3 and ISO/IEC JTC 1/SC 29/WG 11, JCTVC-T1005, 20th Meeting: Geneva, CH, Feb. 10-17, 2015, 565 pages.

Rapaka, et al., "On Parallel Processing Capability of Intra Block Copy", Joint Collaborative Team on Video Coding (JCT-VC) of ITU-T SG 16 WP 3 and ISO/IEC JTC 1/SC 29/WG 11, JCTVC-S0220r1, 19th Meeting: Strasbourg, FR, Oct. 17-24, 2014, 10 pages.

Rapaka, et al., "On parallel processing capabilily of intra block copy", Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, 10 pages.

Joshi, et al., "High Efficiency Video Coding (HEVC) Screen Content Coding: Draft 3", Joint Collaborative Team on Video Coding (JCT-VC) of ITU-T SG 16 WP 3 and ISO/IEC JTC 1/SC 29/WG 11, 20th Meeting: Geneva, CH, Feb. 10-17, 2015, 567 pages.

Boyce, et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 535 pages.

Rapaka, et al., "On parallel processing capability of intra block copy", Joint Collaborative Team on Video Coding (JCT-VC) of ITU-T SG16 WP3 and ISO/IEC JTC1/SC29/WG11 JCTVC-S0220r1, Oct. 17-24, 2014, pp. 1-9.

International Search Report and Written Opinion of PCT Application No. PCT/JP2016/065390, dated Aug. 23, 2016, 08 pages of ISRWO.

Extended European Search Report of EP Patent Application No. 16803156.5, dated Dec. 4, 2018, 10 pages.

Xu, et al., "On Intra Block Copying in RExt", Joint Collaborative Team on Video Coding (JCT-VC) of ITU-T SG 16 WP 3 and ISO/IEC JTC /ISC 29/WG 11, 15th Meeting Geneva, JCTVC-O0232r1, Oct. 23-Nov. 1, 2013, 12 pages.

Tabatabai, et al., "On Intra Block Copying in Rext", Joint Collaborative Team on Video Coding (JCT-VC) of ITU-T SG16 WP3 and ISO/IEC JTC1/SC29/WG11, JCTVC-O0232r1, 15th meeting, Geneva, CH, Oct. 23-Nov. 1, 2013, 13 pages.

Rapaka, et al., "On Parallel Processing Capability of Intra block Copy", Joint Collaborative Team on Video Coding (JCT-VC) of ITU-T SG16 WP3 and ISO/IEC JTC1/SC29/WG11, JCTVC-S0220r1, 19th meeting, Strasbourg, FR, Oct. 17-24, 2014, 09 pages.

Pang, et al., "Non-RCE3: Pipeline Friendly Intra Motion Compensation", Qualcomm Inc., Joint Collaborative Team on Video Coding (JCT-VC) of ITU-T SG16 WP3 and ISO/IEC JTC1/SC29/WG11, JCTVC-N0254, 14th meeting, Vienna, AT, Jul. 25-Aug. 2, 2013, 10 pages.

Laroche, et al., "AHG14: On IBC Constraint for Wavefront Parallel Processing", Joint Collaborative Team on Video Coding (JCT-VC) of ITU-T SG16 WP3 and ISO/IEC JTC1/SC29/WG11, JCTVC-S0070, 19th meeting, Strasbourg, FR, Oct. 17-24, 2014, 06 pages.

Office Action for JP Patent Application No. 2017-521852, dated Feb. 27, 2020, 05 pages of Office Action and 05 pages of English Translation.

Office Action for CN Patent Application No. 201680030966.7, dated Mar. 29, 2021, 8 pages of Office Action and 10 pages of English Translation.

* cited by examiner

IMAGE PROCESSING APPARATUS AND IMAGE PROCESSING METHOD FOR INTRA BC PREDICTION

CROSS REFERENCE TO RELATED APPLICATIONS

This application is a U.S. National Phase of International Patent Application No. PCT/JP2016/065390 filed on May 25, 2016, which claims priority benefit of Japanese Patent Application No. JP 2015-114915 filed in the Japan Patent Office on Jun. 5, 2015. Each of the above-referenced applications is hereby incorporated herein by reference in its entirety.

TECHNICAL FIELD

The present disclosure relates to an image processing apparatus and an image processing method and more particularly to an image processing apparatus and an image processing method which make it possible to reduce a processing load in performing intra BC prediction utilizing correlativity in a screen.

BACKGROUND ART

In recent years, an apparatus that digitally handles image information and compresses and encodes images by employing an encoding system in which compression is performed by orthogonal transform such as discrete cosine transform and motion compensation, utilizing redundancy specific to images for the purpose of efficiently transmitting and accumulating information has become more and more widespread. This encoding system includes, for example, MPEG (Moving Picture Experts Group), H.264/MPEG-4 Part10 Advanced Video Coding (hereinafter, referred to as H.264/AVC or AVC/H.264), and the like.

Currently, for the purpose of further enhancing the encoding efficiency of H.264/AVC, an encoding system called HEVC (High Efficiency Video Coding) is being standardized by JCTVC (Joint Collaboration Team-Video Coding) that is a standardizing body cooperated by ITU-T and ISO/IEC.

Further, Range Extension (HEVC) has been discussed for supporting, for example, a high-end format, for example, images in a color-difference signal format such as 4:2:2 and 4:4:4, a profile for screen content, and the like in the HEVC (e.g., see Non-Patent Literature 1).

By the way, intra Block Copy (intra BC) is an encoding tool that performs prediction by utilizing correlativity in a screen and performing motion compensation in the screen. The intra BC is known as a tool that contributes to improvement of the encoding efficiency for computer screens and artificial images such as CG images. The intra BC is not employed as a technology for extension of the above-mentioned HEVC Range Extension and the technology keeps being discussed for standardizing of Screen Content Coding (SCC) extension (e.g., see Non-Patent Literature 2).

In the current intra BC prediction, all regions preceding, in an encoding order, a current block that is a CU (Coding Unit) that is a current encoding target in a current picture are referable. However, in filter processing such as deblocking filter processing and SAO (Sample adaptive offset) processing, a region surrounding a certain CU is influenced by that CU. Thus, at the time of encoding of the current block, filter processing is not yet performed in a region of referable regions which surrounds the current block. Thus, the intra BC prediction is performed by referring to the referable regions in the current picture before filter processing.

On the other hand, a reference picture in inter prediction is a reference picture different from the current picture. Therefore, at the time of encoding of the current block, filter processing has been performed on all regions in the reference picture. Thus, the inter prediction is performed by referring to the reference picture after filter processing.

As described above, in the current intra BC prediction, all the regions preceding the current block in the encoding order are referable. Therefore, the picture before filter processing is referred unlike the inter prediction. Thus, it is necessary to temporarily retain the picture before the filter processing in a cache or the like, and a memory band and a processing load increase. Further, a mounting cost also increases.

Further, in a case of performing encoding in parallel, decoding of neighboring pixels of the current block cannot be completed before the time of encoding of the current block. Thus, all the regions preceding the current block in the encoding order cannot be made referable. Thus, in the current intra BC prediction, it is difficult to reduce the processing load by performing encoding in parallel.

CITATION LIST

Non-Patent Literature

Non-Patent Literature 1: Jill Boyce, et al. "Draft high efficiency video coding (HEVC) version 2, combined format range extensions (RExt), scalability (SHVC), and multi-view (MV-HEVC) extensions", JCTVC-R1013_v6, 2014.10.1

Non-Patent Literature 2: Rajan Joshi, et al. "High Efficiency Video Coding (HEVC) Screen Content Coding: Draft 3", JCTVC-11005, 2015.2.10-2015.2.17

DISCLOSURE OF INVENTION

Technical Problem

As described above, it is desirable to reduce a processing load in performing intra BC prediction utilizing correlativity in a screen.

The present disclosure has been made in view of the above-mentioned circumstances to enable a processing load in performing intra BC prediction utilizing correlativity in a screen to be reduced.

Solution to Problem

An image processing apparatus according to an aspect of the present disclosure is an image processing apparatus including a limiting unit that limits a motion vector of a current block to be used for prediction utilizing correlativity in a screen, in such a manner that a peripheral pixel of the current block is not used for the prediction of the current block.

An image processing method according to an aspect of the present disclosure corresponds to the image processing apparatus according to the aspect of the present disclosure.

In the aspect of the present disclosure, the motion vector of the current block to be used for the prediction utilizing the correlativity in the screen is limited in such a manner that the peripheral pixel of the current block is not used for the prediction of the current block.

Note that the image processing apparatus according to the aspect of the present disclosure can be realized by causing a computer to execute a program.

Further, in order to realize the image processing apparatus according to the aspect of the present disclosure, the program to be executed by the computer can be provided by transmitting it via a transmission medium or recording it on a recording medium.

The image processing apparatus according to the aspect of the present disclosure may be an independent apparatus or may be an internal block that constitutes a single apparatus.

Advantageous Effects of Invention

In accordance with an aspect of the present disclosure, it is possible to predict an image. Further, in accordance with an aspect of the present disclosure, it is possible to reduce a processing load in performing intra BC prediction utilizing correlativity in a screen.

It should be noted that the effects described here are not necessarily limitative and any effect described in the present disclosure may be given.

MODE(S) FOR CARRYING OUT THE INVENTION

Hereinafter, modes for carrying out the present disclosure (hereinafter, referred to as embodiments) will be described. Note that descriptions will be made in the following order.

Figure 14:
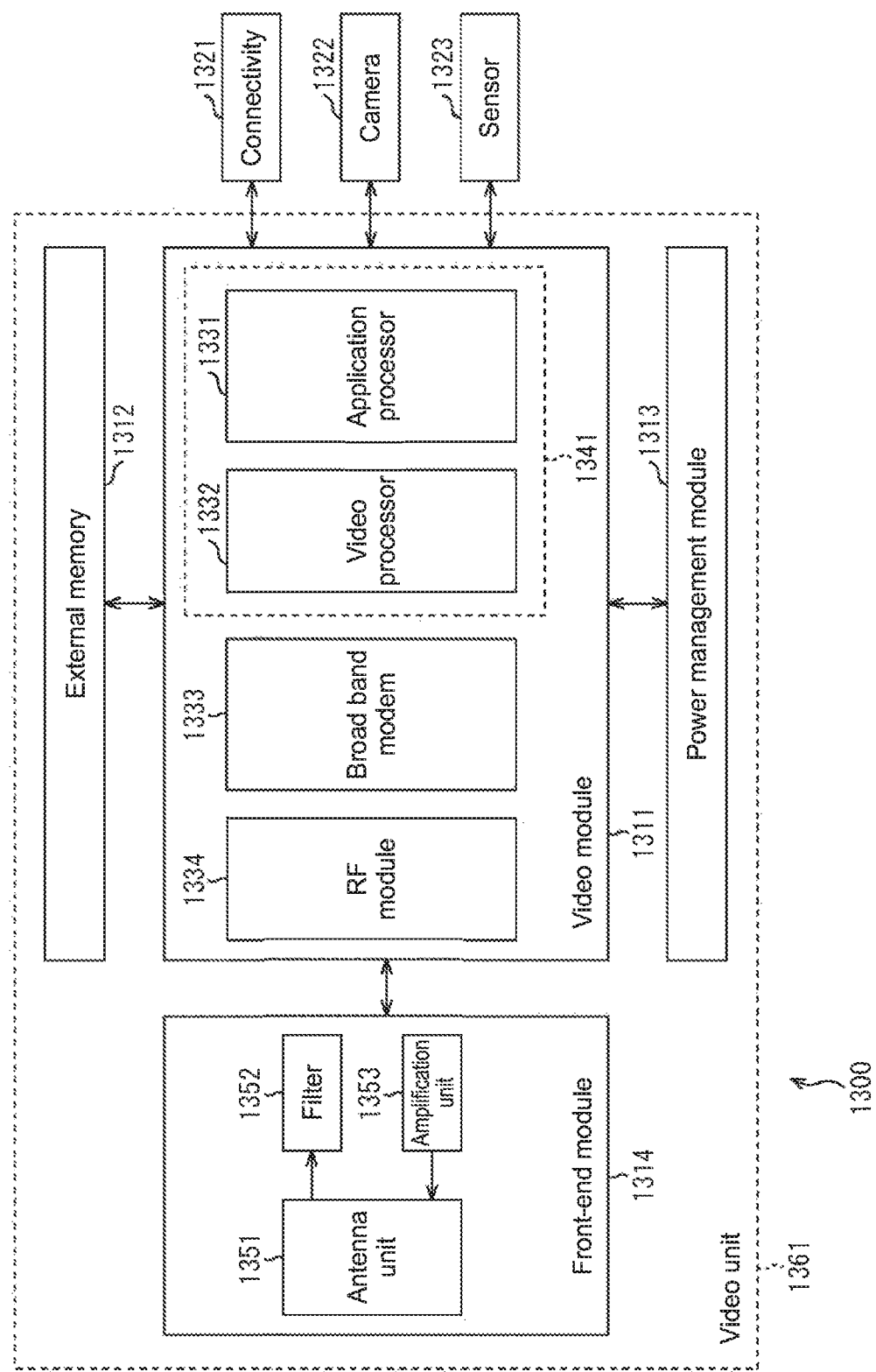
FIG. 14 A diagram showing an example of a schematic configuration of a video set to which the present disclosure is applied.
Figure 15:
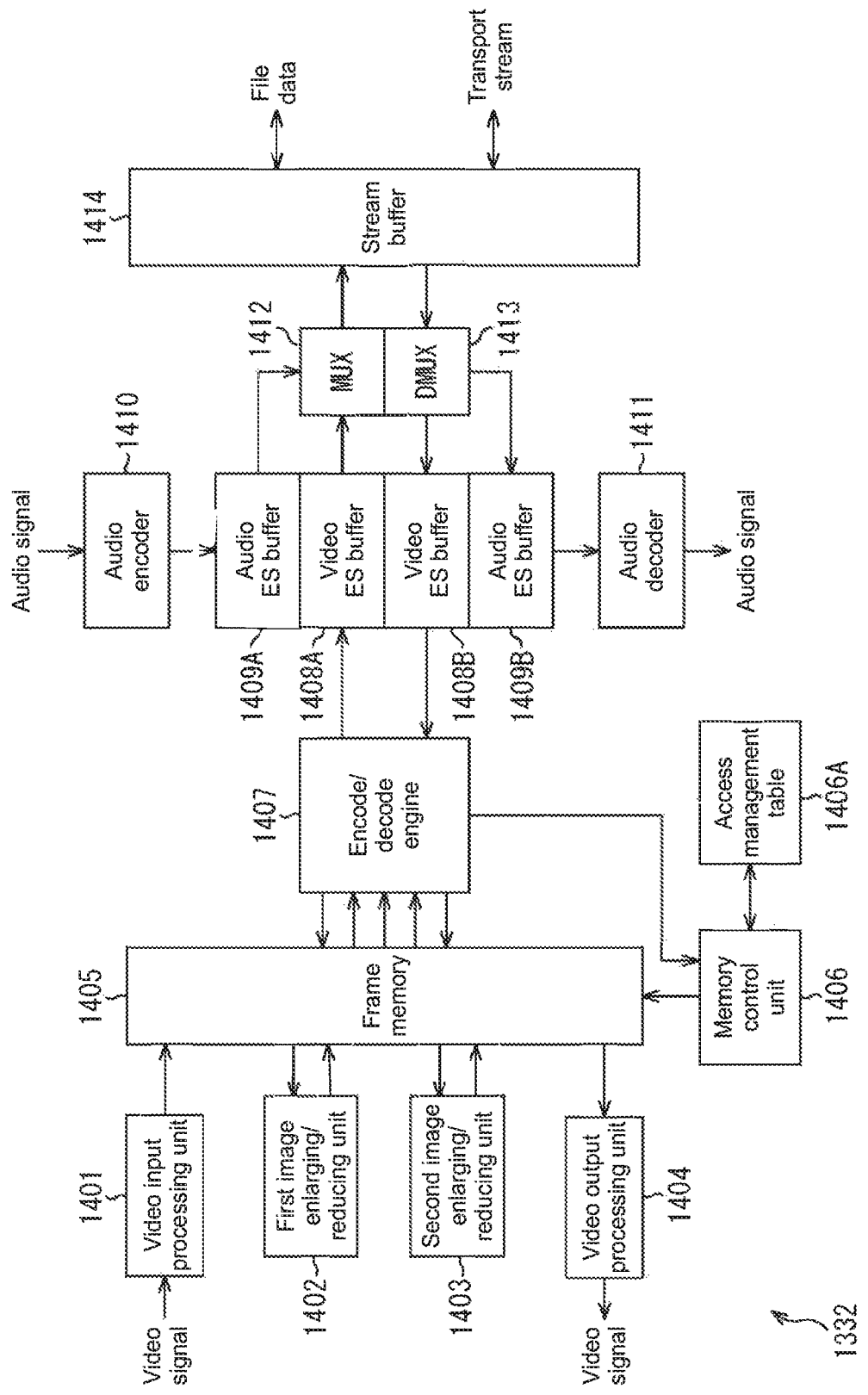
FIG. 15 A diagram showing an example of a schematic configuration of a video processor to which the present disclosure is applied.
Figure 16:
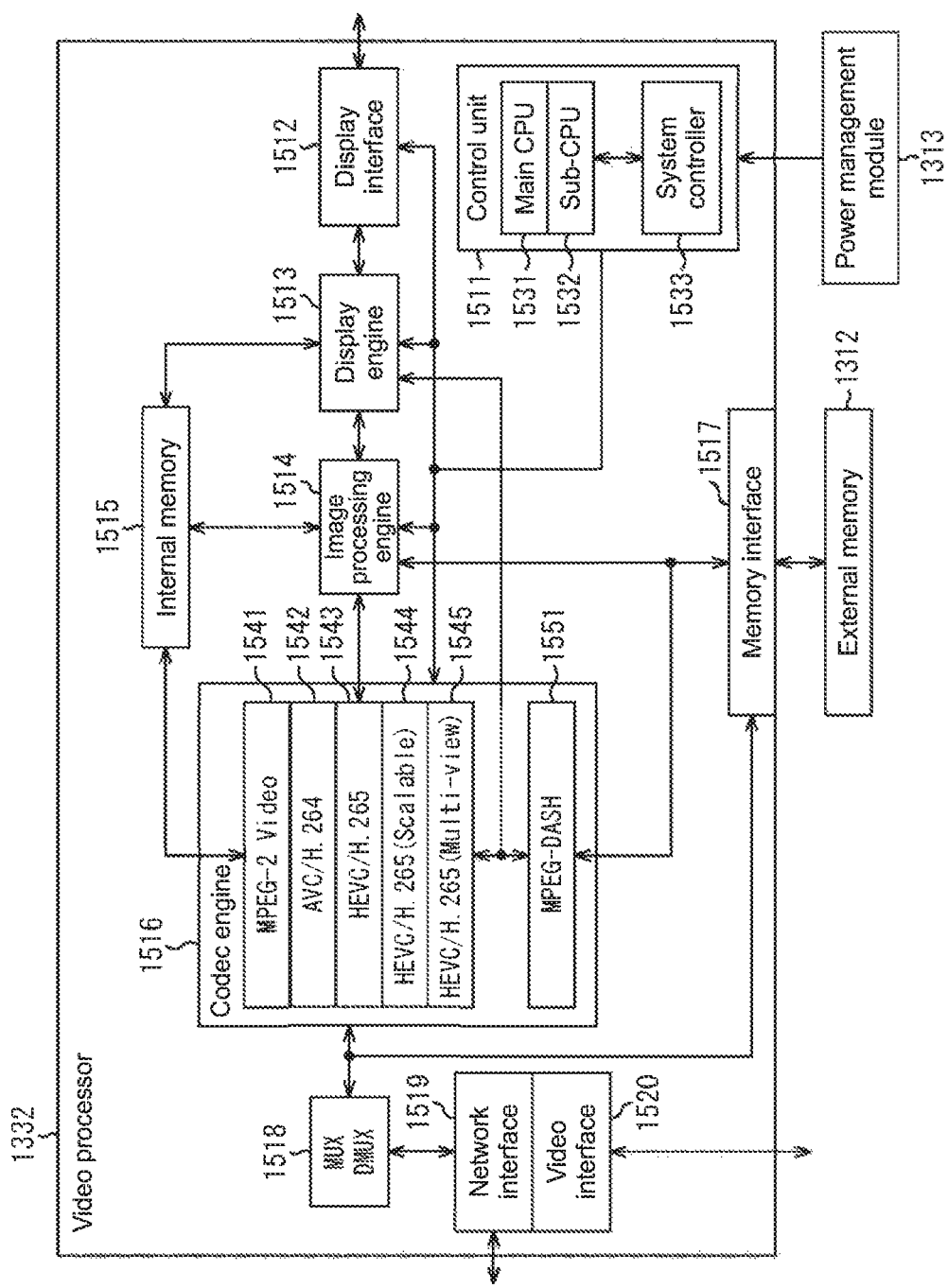
FIG. 16 A diagram showing another example of the schematic configuration of the video processor to which the present disclosure is applied.

1. First Embodiment: Encoding Apparatus and Decoding Apparatus (FIGS. 1 to 8)
2. Second Embodiment: Computer (FIG. 9)
3. Third Embodiment: Television Apparatus (FIG. 10)
4. Fourth Embodiment: Mobile Phone (FIG. 11)
5. Fifth Embodiment: Recording and reproducing apparatus (FIG. 12)
6. Sixth Embodiment: Imaging Apparatus (FIG. 13)
7. Seventh Embodiment: Video Set (FIGS. 14 to 16)

First Embodiment (Configuration Example of Embodiment of Encoding Apparatus)

Figure 1:
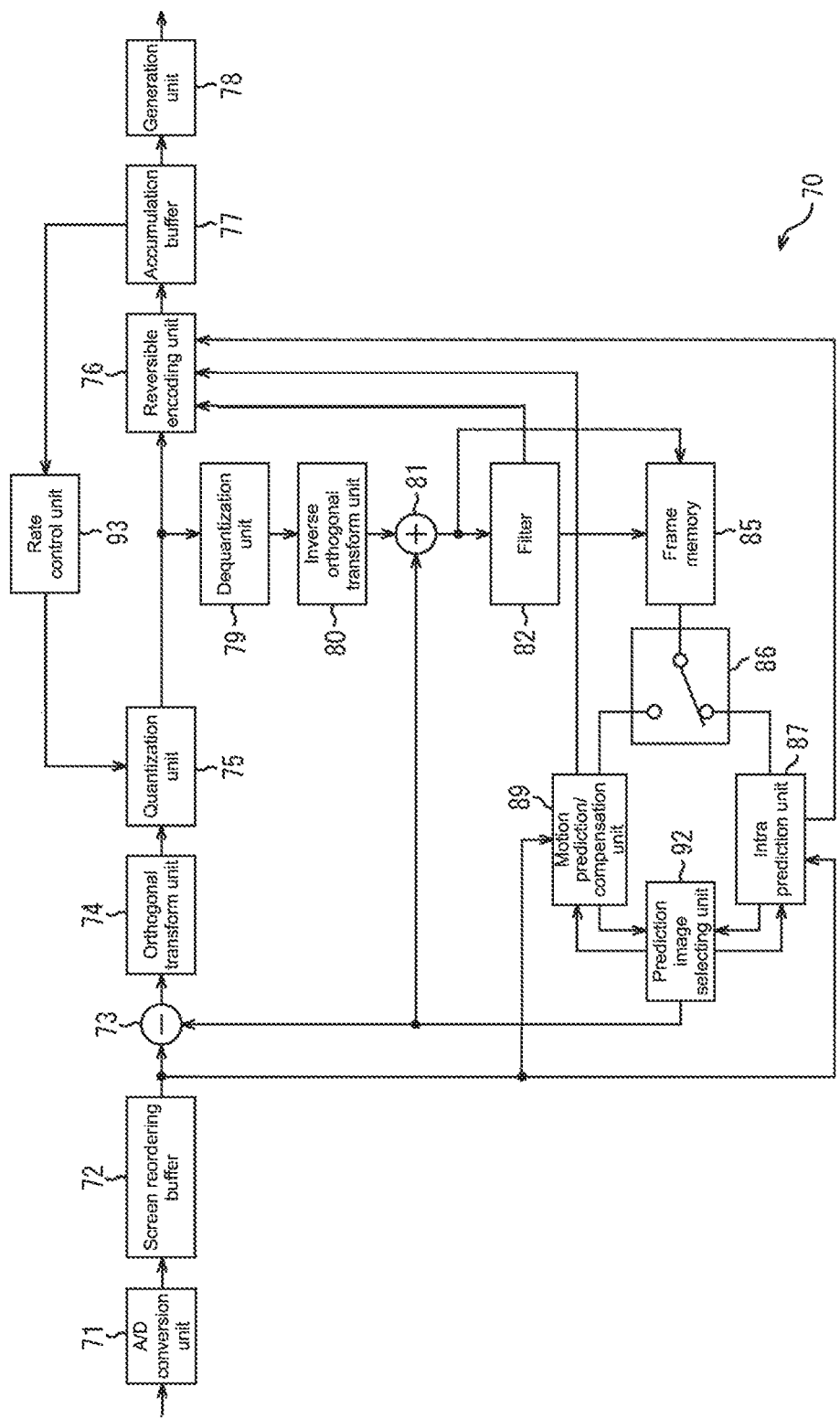
FIG. 1 A block diagram showing a configuration example of an embodiment of an encoding apparatus to which the present disclosure is applied.

FIG. 1 is a block diagram showing a configuration example of an embodiment of an encoding apparatus as an image processing apparatus to which the present disclosure is applied.

An encoding apparatus 70 of FIG. 1 includes an A/D conversion unit 71, a screen reordering buffer 72, an arithmetic unit 73, an orthogonal transform unit 74, a quantization unit 75, a reversible encoding unit 76, an accumulation buffer 77, a generation unit 78, a dequantization unit 79, an inverse orthogonal transform unit 80, and an addition unit 81. Further, the encoding apparatus 70 includes a filter 82, a frame memory 85, a switch 86, an intra prediction unit 87, a motion prediction/compensation unit 89, a prediction image selecting unit 92, and a rate control unit 93. The encoding apparatus 70 encodes a picture in units of frames in accordance with a system complying with HEVC.

A unit of encoding is a Coding UNIT (CU) having a recursive layered structure. Specifically, the CU is set by dividing a picture into fixed-size CTUs (Coding Tree Units) and horizontally and vertically bisecting such CTUs an arbitrary number of times. The maximum size of the CU is an LCU (Largest Coding Unit) and the minimum size is an SCU (Smallest Coding Unit). Further, the CU is divided into PUs (Predicting units) or TUs (transform units).

The A/D conversion unit 71 of the encoding apparatus 70 A/D-converts a picture in units of frames that has been input as an encoding target. The A/D conversion unit 71 outputs the picture that are digital signals after conversion to the screen reordering buffer 72 for storing it.

The screen reordering buffer 72 reorders stored pictures in units of frames, which are arranged in a display order, in an order for encoding in a manner that depends on a GOP structure. The screen reordering buffer 72 sets the reordered pictures as current pictures and sequentially sets respective CUs of the current pictures as current blocks. The screen reordering buffer 72 outputs the current blocks to the arithmetic unit 73, the intra prediction unit 87, and the motion prediction/compensation unit 89.

The arithmetic unit 73 performs encoding by subtracting a prediction image supplied from the prediction image selecting unit 92 from the current block supplied from the screen reordering buffer 72. The arithmetic unit 73 outputs the resulting picture to the orthogonal transform unit 74 as residual information. Note that, if the prediction image is not supplied from the prediction image selecting unit 92, the arithmetic unit 73 outputs the current block, which has been read from the screen reordering buffer 72, to the orthogonal transform unit 74 as the residual information as it is.

The orthogonal transform unit 74 orthogonally transforms the residual information from the arithmetic unit 73 on a TU-by-TU basis. The orthogonal transform unit 74 supplies an orthogonal transform coefficient resulting from the orthogonal transform to the quantization unit 75.

The quantization unit 75 quantizes the orthogonal transform coefficient supplied from the orthogonal transform unit 74. The quantization unit 75 supplies the quantized orthogonal transform coefficient to the reversible encoding unit 76.

The reversible encoding unit 76 acquires intra prediction mode information indicating an optimal intra prediction mode from the intra prediction unit 87. Further, the reversible encoding unit 76 determines inter prediction mode information indicating an optimal inter prediction mode, a motion vector, and a reference picture and acquires reference picture-specifying information and the like from the motion prediction/compensation unit 89. In addition, the reversible encoding unit 76 acquires offset filter information regarding adaptive offset filter processing from the filter 82.

The reversible encoding unit 76 performs reversible encoding such as variable-length encoding (e.g., CAVLC (Context-Adaptive Variable Length Coding) or the like), arithmetic encoding (e.g., CABAC (Context-Adaptive Binary Arithmetic Coding) or the like) on the quantized orthogonal transform coefficient supplied from the quantization unit 75.

Further, the reversible encoding unit 76 reversibly encodes the intra prediction mode information, or the inter prediction mode information, the motion vector, and the reference picture-specifying information, and the offset filter information and the like, as encoded information regarding encoding. The reversible encoding unit 76 adds the encoded information and the like after the reversible encoding to the orthogonal transform coefficient after the reversible encoding and supplies them to the accumulation buffer 77 as encoded data.

The accumulation buffer 77 temporarily stores the encoded data supplied from the reversible encoding unit 76. Further, the accumulation buffer 77 supplies the stored encoded data to the generation unit 78.

The generation unit 78 generates an encoded stream from a parameter set such as an SPS (Sequence Parameter Set) and a PPS (Picture Parameter Set) and the encoded data supplied from the accumulation buffer 77. The generation unit 78 outputs it.

Further, the quantized orthogonal transform coefficient, which has been output from the quantization unit 75, is also input into the dequantization unit 79. The dequantization unit 79 dequantizes the orthogonal transform coefficient quantized by the quantization unit 75, in accordance with a method corresponding to a quantization method of the quantization unit 75. The dequantization unit 79 supplies the orthogonal transform coefficient resulting from the dequantization to the inverse orthogonal transform unit 80.

The inverse orthogonal transform unit 80 performs, on a TU-by-TU basis, inverse orthogonal transform on the orthogonal transform coefficient supplied from the dequantization unit 79, in accordance with a method corresponding to an orthogonal transform method of the orthogonal transform unit 74. The inverse orthogonal transform unit 80 supplies the resulting residual information to the addition unit 81.

The addition unit 81 decodes the current block by adding the residual information supplied from the inverse orthogonal transform unit 80 to the prediction image supplied from the prediction image selecting unit 92. Note that, if the prediction image is not supplied from the prediction image selecting unit 92, the addition unit 81 sets the residual information supplied from the inverse orthogonal transform unit 80 as a decoding result. The addition unit 81 supplies the current block to the frame memory 85 and the filter 82.

The filter 82 retains the current block, which has been supplied from the addition unit 81, as an encoded CU. The filter 82 uses the current block supplied from the addition unit 81 and an encoded CU adjacent to the retained current block (hereinafter, referred to as adjacent block) for performing deblock filter processing on each set of at most three pixels arranged perpendicularly to a boundary about the boundary between the current block and the adjacent block.

The filter 82 performs SAO processing on the pixels after deblock filter processing. There are edge offset processing and band offset processing as types of the SAO processing, and they are selected on an LCU-by-LCU basis.

The edge offset processing is performed by using pixel values of two pixels arranged horizontally, vertically, or obliquely about a pixel that is a processing target. Thus, edge offset processing on each, at most one pixel arranged perpendicularly to a boundary about the boundary between adjacent CUs is performed by using other adjacent CUs.

The filter 82 supplies the pixels after SAO processing to the frame memory 85. Further, the filter 82 supplies information indicating the type of the performed SAO processing and an offset to the reversible encoding unit 76 as the offset filter information.

The frame memory 85 is constituted by, for example, a DRAM (Dynamic Random Access Memory). The frame memory 85 stores a part of the current block before deblock filter processing, which is supplied from the addition unit 81, and the pixels after SAO processing, which are supplied from the filter 82. A pixel of the pixels before deblock filter processing which have been stored in the frame memory 85, which is adjacent to the PU, is supplied to the intra prediction unit 87 via the switch 86 as a peripheral pixel.

Further, the current picture after SAO processing, which has been stored in the frame memory 85, and the picture after SAO processing, which precedes the current picture in the encoding order, are output to the motion prediction/compensation unit 89 via the switch 86 as candidates of the reference picture.

The intra prediction unit 87 performs, on a PU-by-PU basis, intra prediction processing on all intra prediction modes that become candidates by using the peripheral pixel read from the frame memory 85 via the switch 86.

Further, the intra prediction unit 87 calculates, on a PU-by-PU basis, cost function values (to be described later in detail) with respect to all the intra prediction modes that become candidates on the basis of the current block supplied from the screen reordering buffer 72 and prediction images resulting from the intra prediction processing. Then, the intra prediction unit 87 determines, on a PU-by-PU basis, intra prediction mode whose cost function value is minimum, as the optimal intra prediction mode.

The intra prediction unit 87 supplies the prediction image generated on the optimal intra prediction mode and the corresponding cost function value with respect to the current block, to the prediction image selecting unit 92. When notified of selection of the prediction image generated on the optimal intra prediction mode by the prediction image selecting unit 92, the intra prediction unit 87 supplies the intra prediction mode information of each PU of the current block to the reversible encoding unit 76.

Note that the cost function value is also called RD (Rate Distortion) cost and calculated on the basis of a method on a High Complexity mode or a Low Complexity mode, which is defined by JM (Joint Model) that is reference software in an H.264/AVC system, for example. Note that the reference software in the H.264/AVC system is published in http://iphome.hhi.de/suehring/tml/index.htm.

The motion prediction/compensation unit 89 performs, on a PU-by-PU basis, inter prediction and intra BC prediction on all PU modes that become candidates. The PU mode is a mode representing, for example, a system of dividing the PU with respect to the CU.

Specifically, the motion prediction/compensation unit 89 divides, on each PU mode, the encoded region of the current picture and the picture preceding, in the encoding order, the current picture whose horizontal and vertical resolutions have been quadrupled, into PU-size regions and sequentially sets those regions as search regions.

Further, the motion prediction/compensation unit 89 sets a predetermined range excluding the peripheral pixel and the like of the current block in the current picture, as a reference range to be used for detection of the motion vector of the current block. If the search region is present within the reference range, the motion prediction/compensation unit 89 reads the search region of the current picture after SAO processing from the frame memory 85 via the switch 86, as a candidate of a reference block of the reference picture.

The motion prediction/compensation unit 89 determines a correlation value between each PU of the current block supplied from the screen reordering buffer 72 and the candidate of the reference block of the reference picture. If the determined correlation value is larger than the retained correlation value, the motion prediction/compensation unit 89 determines, for each PU on each PU mode, a motion vector of an integer-pixel accuracy between the PU of the current block corresponding to that correlation value and the candidate of the reference block of the reference picture, as a best vector of the intra BC prediction. The motion prediction/compensation unit 89 retains, for each PU on each PU mode, the best vector of the intra BC prediction and the corresponding correlation value. The motion prediction/compensation unit 89 performs, for each PU on each PU mode, compensation processing on the candidate of the reference block of the reference picture on the basis of the best vector of the intra BC prediction and generates a prediction image.

Further, if the search region is present within the picture preceding the current picture in the encoding order, the motion prediction/compensation unit 89 reads a region corresponding to the search region of the picture after SAO processing from the frame memory 85 as the candidate of the reference block of the reference picture. The motion prediction/compensation unit 89 quadruples the horizontal and vertical resolutions of the current block and the candidate of the reference block of the reference picture.

The motion prediction/compensation unit 89 determines a correlation value between each PU of the current block and the candidate of the reference block of the reference picture, whose resolutions have been quadrupled. If the determined correlation value is larger than the retained correlation value, the motion prediction/compensation unit 89 determines, for each PU on each PU mode, a motion vector of a ¼-pixel accuracy between the PU of the current block corresponding to that correlation value and the candidate of the reference block of the reference picture, as a best vector of the inter prediction. The motion prediction/compensation unit 89 retains, for each PU on each PU mode, the best vector of the inter prediction and the corresponding correlation value. The motion prediction/compensation unit 89 performs, for each PU on each PU mode, compensation processing on the candidate of the reference block of the reference picture on the basis of the best vector of the inter prediction and generates a prediction image.

Further, on the basis of the current block and the prediction image, the motion prediction/compensation unit 89 calculates, on a PU-by-PU basis, cost function values with respect to the intra prediction and the intra BC prediction on all the PU modes that become candidates. The motion prediction/compensation unit 89 determines, on a PU-by-PU basis, a mode representing a PU mode whose cost function value is minimum and the inter prediction or intra BC prediction, as the optimal inter prediction mode. Then, the motion prediction/compensation unit 89 supplies the prediction image generated on the optimal inter prediction mode and the corresponding cost function value with respect to the current block, to the prediction image selecting unit 92.

When notified of selection of the prediction image generated on the optimal inter prediction mode by the prediction image selecting unit 92, the motion prediction/compensation unit 89 determines the candidate of the reference picture as the reference picture. Then, the motion prediction/compensation unit 89 supplies the motion vector, the reference picture-specifying information, and the inter prediction mode information corresponding to that prediction image, to the reversible encoding unit 76.

On the basis of the cost function values supplied from the intra prediction unit 87 and the motion prediction/compensation unit 89, the prediction image selecting unit 92 determines either one of the optimal intra prediction mode and the optimal inter prediction mode, whose corresponding cost function value is smaller, as an optimal prediction mode. Then, the prediction image selecting unit 92 supplies the prediction image on the optimal prediction mode to the arithmetic unit 73 and the addition unit 81. Further, the prediction image selecting unit 92 notifies the intra prediction unit 87 or the motion prediction/compensation unit 89 of selection of the prediction image on the optimal prediction mode.

On the basis of the encoded data accumulated in the accumulation buffer 77, the rate control unit 93 controls the rate of quantization operation of the quantization unit 75 so as to prevent overflow or underflow.

(Configuration Example of Intra BC Prediction Unit)

Figure 2:
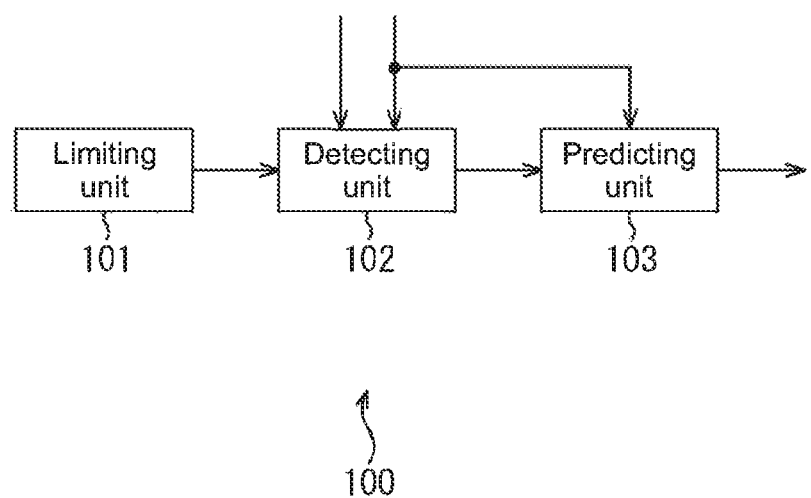
FIG. 2 A block diagram showing a configuration example of an intra BC prediction unit.

FIG. 2 is a block diagram showing a configuration example of the intra BC prediction unit that performs intra BC prediction or the like of the motion prediction/compensation unit 89 of FIG. 1.

An intra BC prediction unit 100 of FIG. 2 is constituted by a limiting unit 101, a detecting unit 102, and a predicting unit 103.

The limiting unit 101 sets a predetermined range excluding the peripheral pixel and the like of the current block in the current picture as the reference range to be used for the detection of the motion vector of the current block. That is, the limiting unit 101 limits the motion vector of the current block to be used for the intra BC prediction, in such a manner that the peripheral pixel of the current block is not used for the intra BC prediction of the current block. The limiting unit 101 supplies the reference range to the detecting unit 102.

If the search region is present within the reference range supplied from the limiting unit 101, the detecting unit 102 reads a search region after SAO processing from the frame memory 85 via the switch 86 as the candidate of the reference block of the reference picture.

The detecting unit 102 determines a correlation value between each PU of the current block supplied from the screen reordering buffer 72 and the candidate of the reference block of the reference picture. If the determined correlation value is larger than the retained correlation value, the detecting unit 102 determines, for each PU on each PU mode, a motion vector of an integer-pixel accuracy between the PU of the current block corresponding to that correlation value and the candidate of the reference block of the reference picture, as the best vector of the intra BC prediction. The detecting unit 102 retains the best vector of the intra BC prediction and the corresponding correlation value. Then, once all the encoded regions of the current picture are set as the search regions, the detecting unit 102 supplies, on each PU mode, the best vector of the intra BC prediction of each PU to the predicting unit 103.

On the basis of the best vector supplied from the detecting unit 102, the predicting unit 103 performs, for each PU on each PU mode, compensation processing on the candidate of the reference block of the reference picture to thereby perform intra BC prediction, and generates a prediction image. Further, the predicting unit 103 calculates, on a PU-by-PU basis, cost function values with respect to the intra BC prediction on all the PU modes that become candidates on the basis of the current block supplied from the screen reordering buffer 72 and the prediction images. The predicting unit 103 outputs the calculated cost function values and the prediction images.

The cost function value output from the intra BC prediction unit 100 in the above-mentioned manner is compared with the cost function value corresponding to the inter prediction on each PU mode. The optimal inter prediction mode is thus determined.

(Example of Reference Range)

Figure 3:
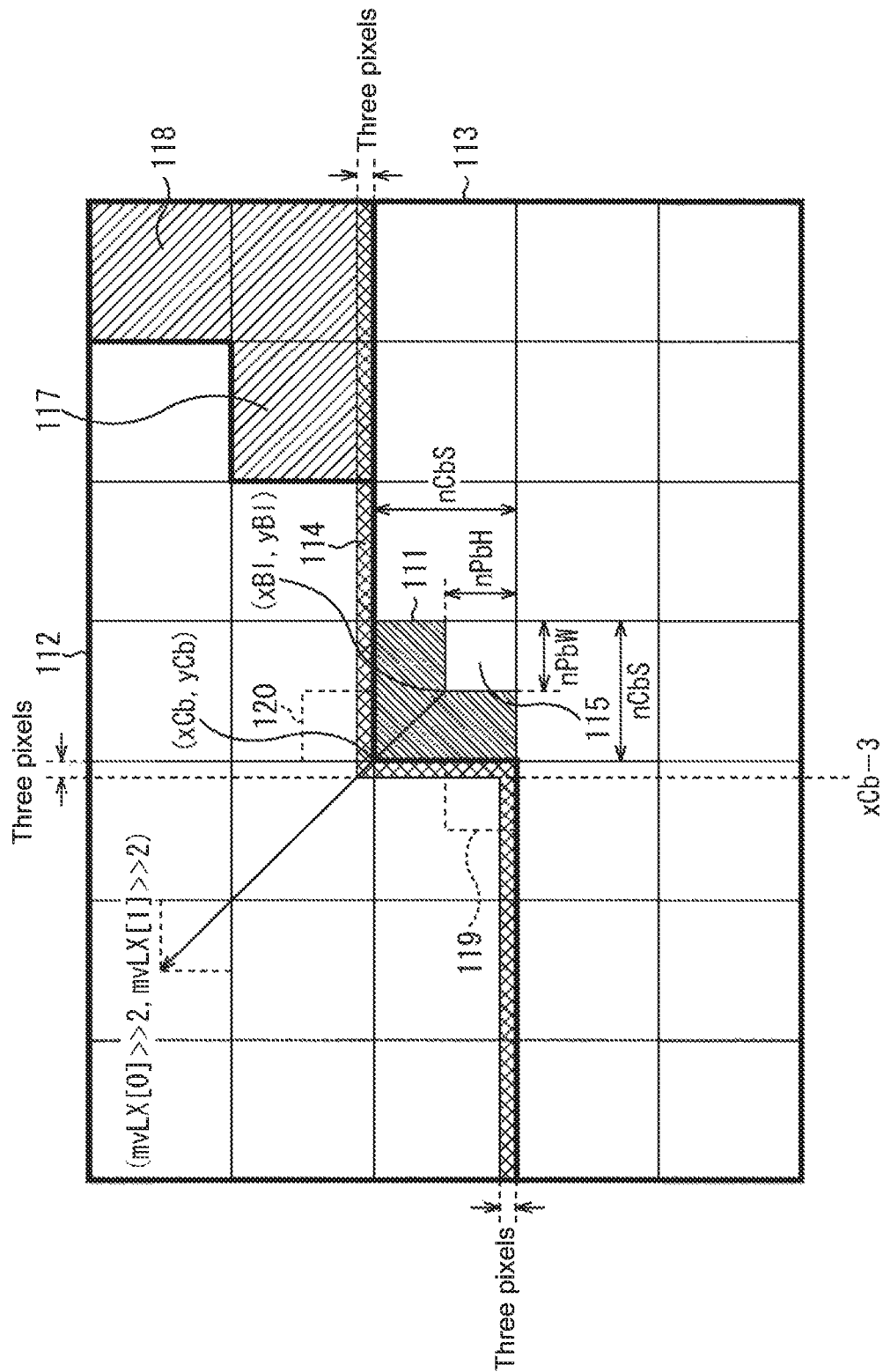
FIG. 3 A diagram showing an example of a reference range.

FIG. 3 is a diagram showing an example of the reference range.

In the example of FIG. 3, an image that is an encoding target is divided into seven (horizontal)×five (vertical) CUs.

Provided that the current block is a CU 111 at the center, a CU group 112 formed of CUs present above the CU 111 or located at the same vertical position as the CU 111 and present on the left-hand side of the CU 111 has been already encoded. On the other hand, the CU 111 and a CU group 113 formed of CUs present below the CU 111 or located at the same vertical position as the CU 111 and present on the right-hand side of the CU 111 have not yet been encoded.

Further, as described above, in the deblock filter processing, at most three pixels arranged from the boundary with an adjacent CU in the CUs perpendicularly to that boundary are influenced by that adjacent CU. Further, in the SAO processing, at most one pixel arranged from the boundary with an adjacent CU in the CUs perpendicularly to that boundary is influenced by that adjacent CU.

Thus, as shown in FIG. 3, the SAO processing may not yet have been performed on a region 114 within the CU group 112 which is arranged corresponding to three pixels from a boundary between the CU group 112 and the CU group 113 perpendicularly to that boundary. Thus, the limiting unit 101 excludes from the reference range the region 114 of the CU group 112, whose horizontal or vertical distance from the CU group 113 is equal to or smaller than a distance equivalent to three pixels.

With this, the intra BC prediction can be performed by using a region other than the region 114 of the CU group 112, on which the SAO processing has been performed.

Thus, it is unnecessary to provide a cache for the intra BC prediction unlike a case of temporarily retaining the CU group 112 before deblock filter processing and SAO processing in a cache or the like and using it for the intra BC prediction. As a result, it is possible to prevent a memory band, a processing load, and a mounting cost from increasing.

When the region 114 is excluded from the reference range, a motion vector (mvLX[0]z>>2, mvLX[1]>>2) of a PU 115 within the CU 111 satisfies the following condition of Expression (1).

[Expression 1]

if $(xBl+(mvLX[0]>>2)+nPbW<xCb-3)$ $yBl+(mvLX[1]>>2)+nPbH<yCb+nCbS-3$ else $$yBl+(mvLX[1]>>2)+nPbH<yCb-3 \qquad (1)$$

Note that xBl and yBl are respectively an x-coordinate and a y-coordinate of an upper left vertex of the PU 115. Further, nPbW and nPbH are respectively a horizontal size and a vertical size of the PU 115. Further, xCb and yCb are respectively an x-coordinate and a y-coordinate of an upper left vertex of the CU 111.

Further, also if the encoding processing is in parallel performed on the current picture by WPP (Wave front Parallel Processing), in order to make the reference range referable, the limiting unit 101 excludes from the reference range a CTU deviated by a 2N-number of CTUs rightward deviated from a CTU by N-number of CTUs upward from a CTU including the CU 111 and right and upper right CTUs with respect to that CTU.

In the example of FIG. 3, the CU is the CTU and N is 1. Thus, the limiting unit 101 excludes a region 118 from the reference range. The region 118 includes a CU 117 rightward deviated by two CUs from a CU directly above the CU 111 and CUs present on the right-hand side and the upper right-hand side of the CU 117.

As described above, the reference range in the intra BC prediction is a region excluding the region 114 and the region 118 within the CU group 112. Thus, a block 119 having a size identical to that of the PU 115 and leftward adjacent to the CU 111 and a block 120 having a size identical to that of the PU 115 and upward adjacent to the CU 111 are not used for detection of the motion vector of the PU 115. Although the image to be used for the detection of the motion vector is limited in this manner, the influence on the encoding efficiency is ignorable.

Note that xCb and yCb do not need to be the CU 111 and may be an x-coordinate and a y-coordinate of an upper left vertex of a CTU including the CU 111.

(Description of Processing of Encoding Apparatus)

Figure 4:
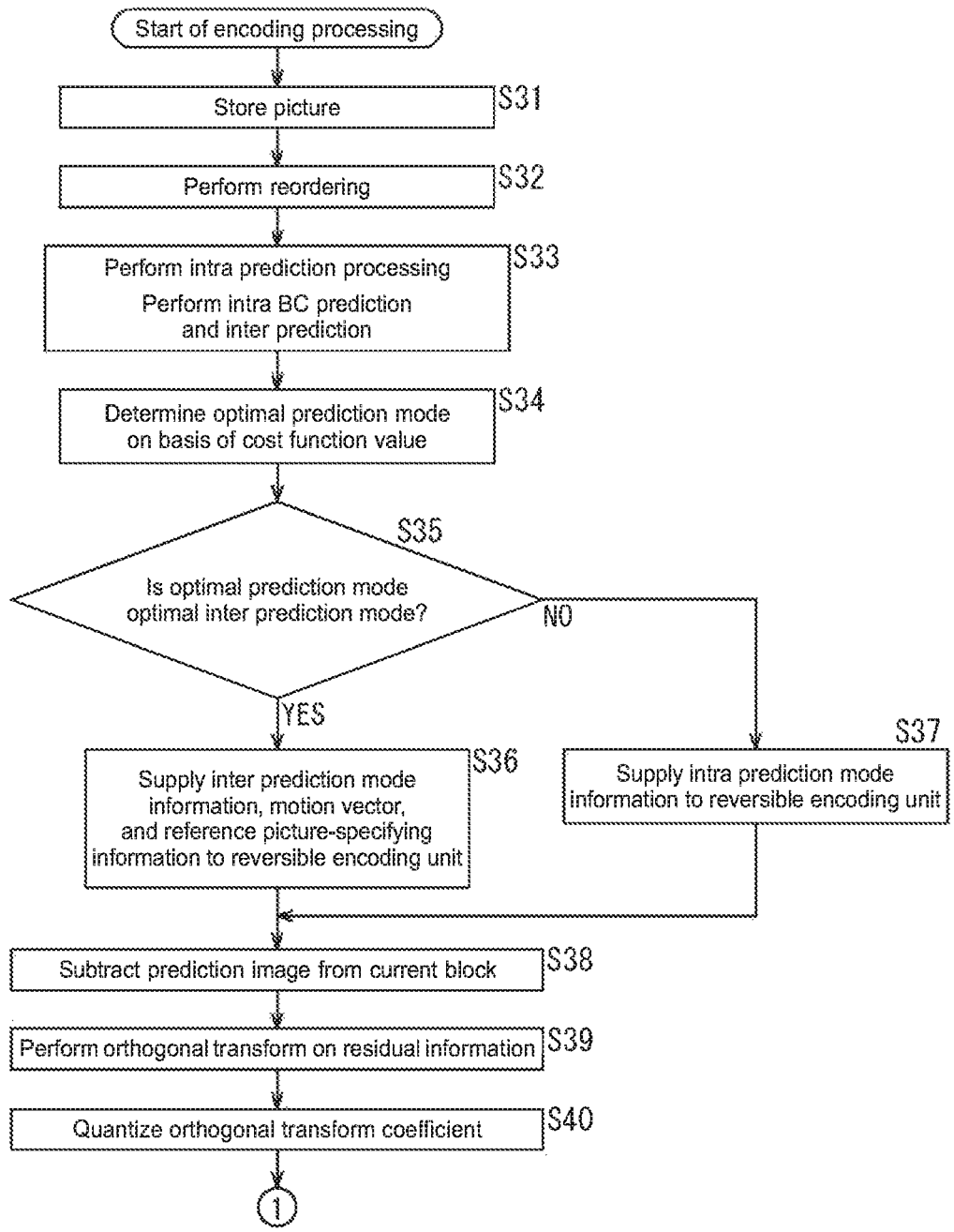
FIG. 4 A flowchart describing encoding processing of the encoding apparatus of FIG. 1.
Figure 5:
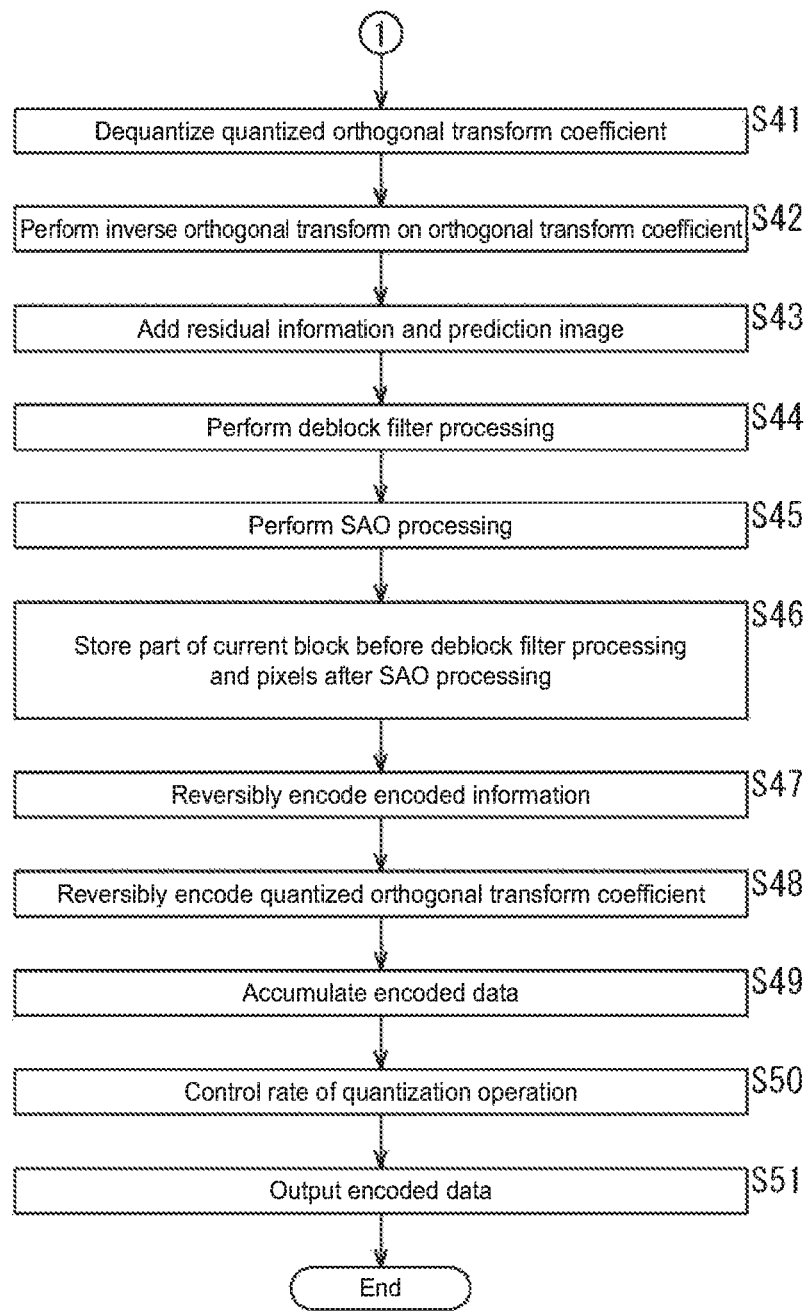
FIG. 5 A flowchart describing encoding processing of the encoding apparatus of FIG. 1.

FIGS. 4 and 5 are flowcharts describing the encoding processing of the encoding apparatus 70 of FIG. 1.

In Step S31 of FIG. 4, the A/D conversion unit 71 of the encoding apparatus 70 A/D-converts a picture in units of frames which is input as the encoding target and outputs a picture that are digital signals after conversion to the screen reordering buffer 72 for storing it.

In Step S32, the screen reordering buffer 72 reorders stored pictures in units of frames, which is arranged in a display order, in an order for encoding in a manner that depends on a GOP structure. The screen reordering buffer 72 sets the reordered pictures in units of frames as current pictures and sequentially sets respective CUs of the current pictures as current blocks. The screen reordering buffer 72 supplies the current block to the arithmetic unit 73, the intra prediction unit 87, and the motion prediction/compensation unit 89.

In Step S33, the intra prediction unit 87 uses, on a PU-by-PU basis, the peripheral pixel read from the frame memory 85 via the switch 86 for performing intra prediction processing on all intra prediction modes that become candidates. Further, the intra prediction unit 87 calculates, on a PU-by-PU basis, cost function values with respect to all the intra prediction modes that become candidates on the basis of the current block supplied from the screen reordering buffer 72 and prediction images resulting from the intra prediction processing. Then, the intra prediction unit 87 determines, on a PU-by-PU basis, an intra prediction mode an intra prediction mode whose minimum cost function value is minimum, as the optimal intra prediction mode.

The intra prediction unit 87 supplies the prediction image generated on the optimal intra prediction mode and the corresponding cost function value with respect to the current block, to the prediction image selecting unit 92. When notified of selection of the prediction image generated on the optimal intra prediction mode by the prediction image selecting unit 92, the intra prediction unit 87 supplies the intra prediction mode information to the reversible encoding unit 76.

Further, the motion prediction/compensation unit 89 performs, on a PU-by-PU basis, inter prediction and intra BC prediction on all the PU modes that become candidates. Further, the motion prediction/compensation unit 89 calculates, on a PU-by-PU basis, cost function values with respect to the inter prediction and the intra BC prediction on all the PU modes that become candidates on the basis of the current block and prediction images resulting from the inter prediction and intra BC prediction. The motion prediction/compensation unit 89 determines, on a PU-by-PU basis, a mode representing a PU mode whose cost function value is minimum and the inter prediction or intra BC prediction, as the optimal inter prediction mode. Then, the motion prediction/compensation unit 89 supplies the prediction image generated on the optimal inter prediction mode and the minimum value of the corresponding cost function value with respect to the current block, to the prediction image selecting unit 92.

In Step S34, on the basis of the cost function values supplied from the intra prediction unit 87 and the motion prediction/compensation unit 89, the prediction image selecting unit 92 determines one of the optimal intra prediction mode and the optimal inter prediction mode whose corresponding cost function value is minimum, as an optimal prediction mode. Then, the prediction image selecting unit 92 supplies the prediction image on the optimal prediction mode to the arithmetic unit 73 and the addition unit 81.

In Step S35, the prediction image selecting unit 92 determines whether or not the optimal prediction mode is the optimal inter prediction mode. If it is in Step S35 determined that the optimal prediction mode is the optimal inter prediction mode, the prediction image selecting unit 92 notifies the motion prediction/compensation unit 89 of selection of the prediction image generated on the optimal inter prediction mode.

In Step S36, the motion prediction/compensation unit 89 supplies inter prediction mode information, a motion vector, and reference picture-specifying information corresponding to the prediction image selected by the prediction image selecting unit 92, to the reversible encoding unit 76. Then, the processing proceeds to Step S38.

On the other hand, if it is in Step S35 determined that the optimal prediction mode is not the optimal inter prediction mode, in other words, if the optimal prediction mode is the optimal intra prediction mode, the prediction image selecting unit 92 notifies the intra prediction unit 87 of selection of the prediction image generated on the optimal intra prediction mode. Then, in Step S37, the intra prediction unit 87 supplies intra prediction mode information corresponding to the prediction image selected by the prediction image selecting unit 92 to the reversible encoding unit 76 for causing the processing to proceed to Step S38.

In Step S38, the arithmetic unit 73 performs encoding by subtracting the prediction image supplied from the prediction image selecting unit 92 from the current block supplied from the screen reordering buffer 72. The arithmetic unit 73 outputs the resulting picture to the orthogonal transform unit 74 as the residual information.

In Step S39, the orthogonal transform unit 74 performs orthogonal transform on the residual information from the arithmetic unit 73 on a TU-by-TU basis and supplies the resulting orthogonal transform coefficient to the quantization unit 75.

In Step S40, the quantization unit 75 quantizes the orthogonal transform coefficient supplied from the orthogonal transform unit 74 and supplies the quantized orthogonal transform coefficient to the reversible encoding unit 76 and the dequantization unit 79.

In Step S41 of FIG. 5, the dequantization unit 79 dequantizes the quantized coefficient supplied from the quantization unit 75 and supplies the resulting orthogonal transform coefficient to the inverse orthogonal transform unit 80.

In Step S42, the inverse orthogonal transform unit 80 performs inverse orthogonal transform on the orthogonal transform coefficient supplied from the dequantization unit 79 on a TU-by-TU basis and supplies the resulting residual information to the addition unit 81.

In Step S43, the addition unit 81 adds residual information supplied from the inverse orthogonal transform unit 80 and the prediction image supplied from the prediction image selecting unit 92 and decodes the current block. The addition unit 81 supplies the decoded current block to the frame memory 85 and the filter 82. The filter 82 retains the current block supplied from the addition unit 81, as the encoded CU.

In Step S44, the filter 82 uses the current block supplied from the addition unit 81 and the adjacent block to perform deblock filter processing on each set of at most three pixels arranged perpendicularly to the boundary about the boundary between the current block and the adjacent block.

In Step S45, the filter 82 performs SAO processing on the pixels after deblock filter processing. The filter 82 supplies the pixels after SAO processing to the frame memory 85. Further, the filter 82 supplies information indicating the type of the performed SAO processing and an offset to the reversible encoding unit 76 as the offset filter information.

In Step S46, the frame memory 85 stores a part of the current block before deblock filter processing, which is supplied from the addition unit 81, and the pixels after SAO processing, which are supplied from the filter 82. A pixel of the pixels before deblock filter processing which have been stored in the frame memory 85, which is adjacent to the PU, is supplied to the intra prediction unit 87 via the switch 86 as the peripheral pixel.

Further, the current picture after SAO processing, which has been stored in the frame memory 85, and the picture after SAO processing, which precedes the current picture in the encoding order, are output to the motion prediction/compensation unit 89 via the switch 86 as the candidates of the reference picture.

In Step S47, the reversible encoding unit 76 reversibly encodes the intra prediction mode information or the inter prediction mode information, the motion vector, and the reference picture-specifying information, and the offset filter information, as encoded information.

In Step S48, the reversible encoding unit 76 reversibly encodes the quantized orthogonal transform coefficient supplied from the quantization unit 75. Then, the reversible encoding unit 76 generates encoded data from the encoded information reversibly encoded in the processing of Step S47 and the reversibly encoded orthogonal transform coefficient, and supplies it to the accumulation buffer 77.

In Step S49, the accumulation buffer 77 temporarily accumulates the encoded data supplied from the reversible encoding unit 76.

In Step S50, on the basis of the encoded data accumulated in the accumulation buffer 77, the rate control unit 93 controls the rate of quantization operation of the quantization unit 75 so as to prevent overflow or underflow.

In Step S51, the generation unit 78 generates an encoded stream from the encoded data stored in the accumulation buffer 77 and outputs it.

Note that, although, for the sake of simplifying the description, it is assumed that the intra prediction processing and the intra BC prediction and the inter prediction are constantly performed in the encoding processing of FIGS. 4 and 5, in fact, only either one of them may be performed in a manner that depends on a picture type and the like.

Figure 6:
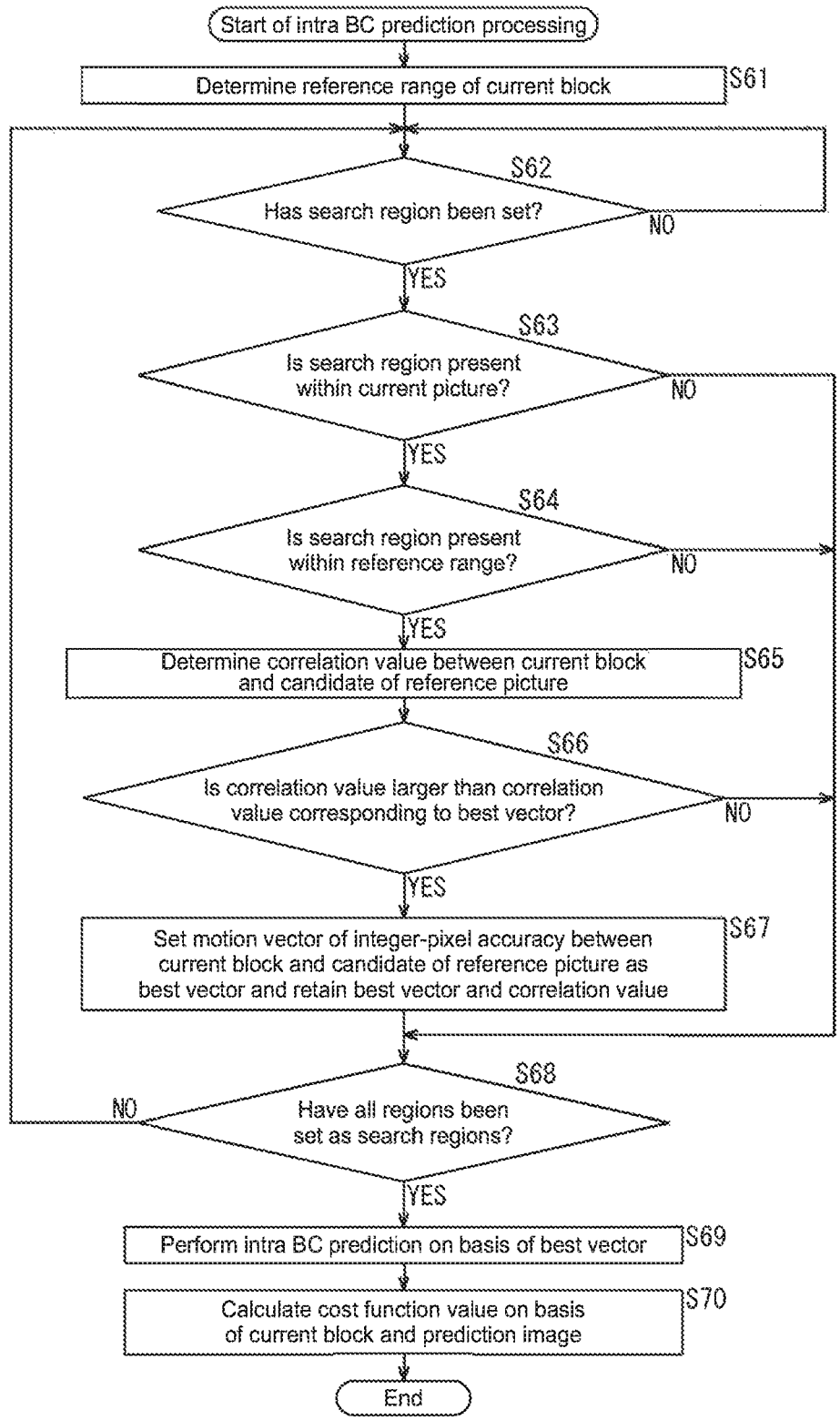
FIG. 6 A flowchart describing details of intra BC prediction processing.

FIG. 6 is a flowchart describing details of intra BC prediction processing in which the intra BC prediction and the like of the processing in Step S33 of FIG. 4 are performed.

In Step S61 of FIG. 6, the limiting unit 101 (FIG. 2) of the motion prediction/compensation unit 89 determines a reference range of the current block and supplies it to the detecting unit 102. The processing of Steps S62 to S70 is performed on each PU mode.

In Step S62, the detecting unit 102 determines whether or not a new search region has been set by the motion prediction/compensation unit 89. If it is in Step S62 determined that the new search region has not yet been set, the detecting unit 102 stands by until the new search region is set.

On the other hand, if it is in Step S62 determined that the new search region has been set, in Step S63, the detecting unit 102 determines whether or not the newly set search region is present within the current picture.

If it is in Step S63 determined that the search region is present within the current picture, in Step S64, the detecting unit 102 determines whether or not the search region is present within the reference range supplied from the limiting unit 101.

If it is in Step S64 determined that the search region is present within the reference range, the detecting unit 102 reads a search region after SAO processing from the frame memory 85 via the switch 86 as the candidate of the reference block of the reference picture.

Then, in Step S65, the detecting unit 102 determines a correlation value between each PU of the current block supplied from the screen reordering buffer 72 and the candidate of the reference block of the reference picture. In Step S66, on a PU-by-PU basis, the detecting unit 102 determines whether or not the correlation value determined in Step S65 is larger than a correlation value corresponding to the retained best vector. If it is in Step S66 determined that the correlation value is larger than the correlation value corresponding to the best vector, the processing proceeds to Step S67.

In Step S67, the detecting unit 102 sets a motion vector of an integer-pixel accuracy between the PU of the current block corresponding to the correlation value determined in Step S65 and the candidate of the reference block of the reference picture as a best vector and retains that best vector and the corresponding correlation value. Then, the processing proceeds to Step S68.

Further, if it is in Step S63 determined that the search region is not present within the current picture, if it is in Step S64 determined that the search region is not present within the reference range, or if it is in Step S66 determined that the correlation value is not larger than the correlation value corresponding to the best vector, the processing proceeds to Step S68.

In Step S68, the detecting unit 102 determines whether or not all the encoded regions of the current picture have been set as the search regions by the motion prediction/compensation unit 89. If it is in Step S68 determined that all the regions have not yet been set as the search regions, the processing returns to Step S62. Then, the processing of Steps S62 to S68 is repeated until all the regions are set as the search regions.

On the other hand, if it is in Step S68 determined that all the regions have been set as the search regions, the detecting unit 102 supplies the retained best vector of each PU to the predicting unit 103. Then, in Step S69, on the basis of the best vector supplied from the detecting unit 102, the predicting unit 103 performs, on a PU-by-PU basis, compensation processing on the candidate of the reference block of the reference picture to thereby perform intra BC prediction, and generates a prediction image.

In Step S70, on the basis of the current block supplied from the screen reordering buffer 72 and the prediction image, the predicting unit 103 calculates a cost function value on a PU-by-PU basis. The predicting unit 103 outputs the cost function value and the prediction image.

The cost function value output from the intra BC prediction unit 100 in the above-mentioned manner is compared with the cost function value corresponding to the inter prediction on each PU mode by the motion prediction/compensation unit 89. The optimal inter prediction mode is thus determined.

As described above, the encoding apparatus 70 limits the motion vector of the current block to be used for the intra BC prediction, in such a manner that the region other than the reference range in the current picture is not used for prediction of the current block. Thus, for example, in the intra BC prediction, it is possible to refer to the picture after SAO processing as the reference picture. As a result, it becomes unnecessary to prepare a cache or the like for the reference picture of the intra BC prediction, and it is possible to prevent the memory band, the processing load, and the mounting cost in performing intra BC prediction from increasing.

(Configuration Example of Embodiment of Decoding Apparatus)

Figure 7:
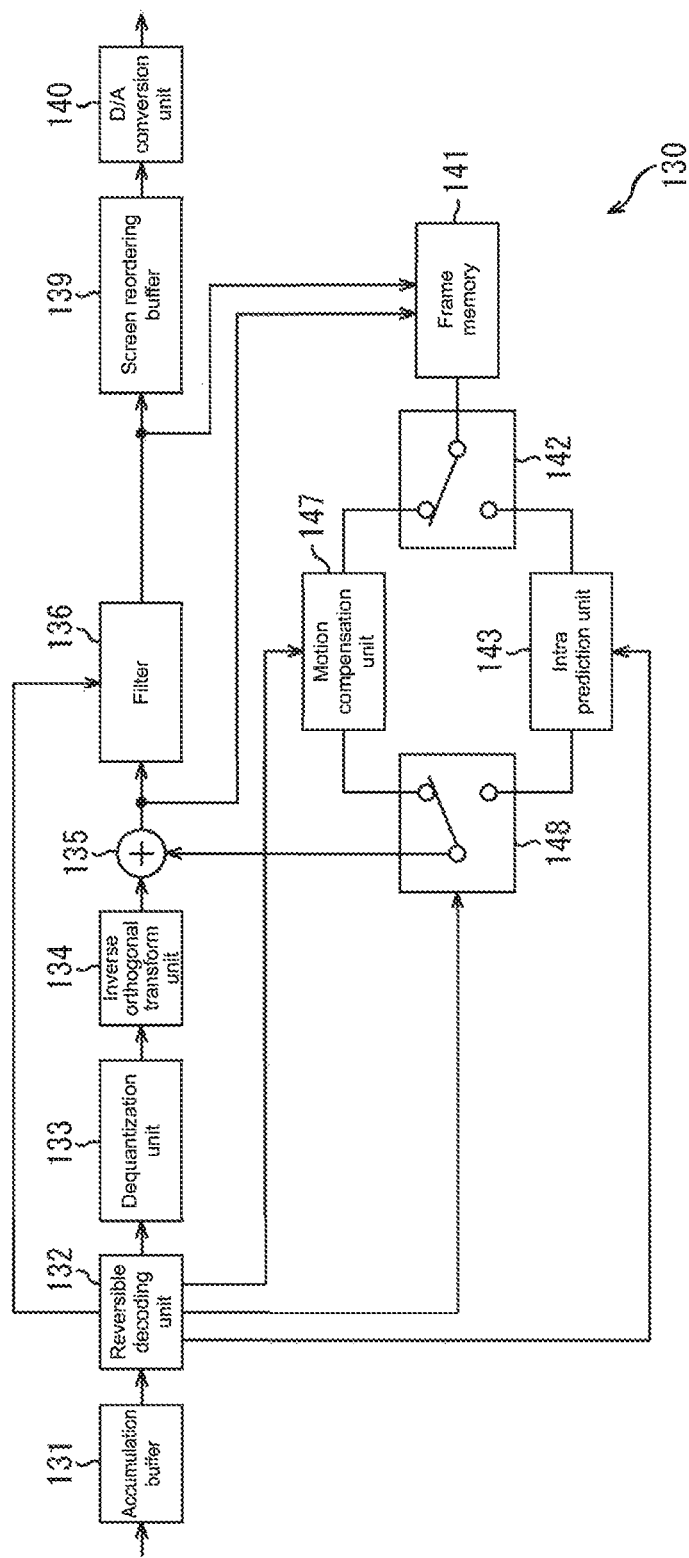
FIG. 7 A block diagram showing a configuration example of an embodiment of a decoding apparatus to which the present disclosure is applied.

FIG. 7 is a block diagram showing a configuration example of an embodiment of a decoding apparatus as an image processing apparatus to which the present disclosure is applied that decodes an encoded stream transmitted from the encoding apparatus 70 of FIG. 1.

A decoding apparatus 130 of FIG. 7 includes an accumulation buffer 131, a reversible decoding unit 132, a dequantization unit 133, an inverse orthogonal transform unit 134, an addition unit 135, a filter 136, a screen reordering buffer 139, and a D/A conversion unit 140. Further, the decoding apparatus 130 includes a frame memory 141, a switch 142, an intra prediction unit 143, a motion compensation unit 147, and a switch 148.

The accumulation buffer 131 of the decoding apparatus 130 receives an encoded stream from the encoding apparatus 70 of FIG. 1 and accumulates it. The accumulation buffer 131 sequentially supplies encoded data of each CU of the accumulated encoded stream to the reversible decoding unit 132 as encoded data of the current block. Note that a parameter set of the encoded stream is supplied to the respective blocks of the decoding apparatus 130 in a manner that depends on needs and used for the processing.

The reversible decoding unit 132 performs reversible decoding such as variable-length decoding and arithmetic decoding corresponding to the reversible encoding of the reversible encoding unit 76 of FIG. 1, on the encoded data from the accumulation buffer 131, to thereby obtain the quantized orthogonal transform coefficient and the encoded information. The reversible decoding unit 132 supplies the quantized orthogonal transform coefficient to the dequantization unit 133. Further, the reversible decoding unit 132 supplies the intra prediction mode information and the like as the encoded information to the intra prediction unit 143 and supplies the reference picture-specifying information, the motion vector, the inter prediction mode information, and the like to the motion compensation unit 147.

In addition, the reversible decoding unit 132 supplies the intra prediction mode information or the inter prediction mode information as the encoded information to the switch 148. The reversible decoding unit 132 supplies the offset filter information as the encoded information to the filter 136.

The dequantization unit 133, the inverse orthogonal transform unit 134, the addition unit 135, the filter 136, the frame memory 141, the switch 142, the intra prediction unit 143, and the motion compensation unit 147 perform processing similar to that of the dequantization unit 79, the inverse orthogonal transform unit 80, the addition unit 81, the filter 82, the frame memory 85, the switch 86, the intra prediction unit 87, and the motion prediction/compensation unit 89 of FIG. 1, respectively. With this, the current block is decoded.

Specifically, the dequantization unit 133 dequantizes the quantized orthogonal transform coefficient from the reversible decoding unit 132 and supplies the resulting orthogonal transform coefficient to the inverse orthogonal transform unit 134.

The inverse orthogonal transform unit 134 performs, on a TU-by-TU basis, inverse orthogonal transform on the orthogonal transform coefficient from the dequantization unit 133. The inverse orthogonal transform unit 134 supplies residual information resulting from the inverse orthogonal transform to the addition unit 135.

The addition unit 135 adds the residual information supplied from the inverse orthogonal transform unit 134 to the prediction image supplied from the switch 148 to thereby decode the current block. Note that, if the prediction image is not supplied from the switch 148, the addition unit 135 sets the residual information supplied from the inverse orthogonal transform unit 134 as a decoding result. The addition unit 135 supplies the current block resulting from the decoding to the frame memory 141 and the filter 136.

The filter 136 retains the current block supplied from the addition unit 135, as the encoded CU. The filter 136 uses the current block supplied from the addition unit 135 and the adjacent block for performing deblock filter processing on each set of at most three pixels arranged perpendicularly to the boundary about the boundary between the current block and the adjacent block.

The filter 136 performs SAO processing of the type represented by the offset filter information, on the pixels after deblock filter processing by using the offset represented by the offset filter information supplied from the reversible decoding unit 132. The filter 136 supplies the pixels after SAO processing to the frame memory 141 and the screen reordering buffer 139.

The screen reordering buffer 139 stores the pixels after SAO processing supplied from the filter 136, in units of frames. The screen reordering buffer 139 reorders stored pictures in units of frames in the order for encoding, in the original display order and supplies them to the D/A conversion unit 140.

The D/A conversion unit 140 D/A-coverts the picture supplied from the screen reordering buffer 139 and outputs it.

The frame memory 141 is constituted by, for example, a DRAM. The frame memory 141 stores a part of the current block before the deblock filter processing supplied from the addition unit 135 and the pixels after SAO processing supplied from the filter 136. A pixel of the pixels before deblock filter processing which have been stored in the frame memory 141, which is adjacent to the PU, is supplied to the intra prediction unit 143 via the switch 142 as the peripheral pixel.

Further, the current picture after SAO processing stored in the frame memory 141 and the picture after SAO processing preceding the current picture in the encoding order are output to the motion compensation unit 147 via the switch 142 as the reference picture.

The intra prediction unit 143 uses, on a PU-by-PU basis, the peripheral pixel, has been read from the frame memory 141 via the switch 142, for performing intra prediction processing on the optimal intra prediction mode indicated by the intra prediction mode information supplied from the reversible decoding unit 132. The intra prediction unit 143 supplies the resulting prediction image to the switch 148.

The motion compensation unit 147 performs, on a PU-by-PU basis, motion compensation processing on the basis of the inter prediction mode information, the reference picture-specifying information, and the motion vector supplied from the reversible decoding unit 132.

Specifically, the motion compensation unit 147 reads a reference picture specified by the reference picture-specifying information, from the frame memory 141 via the switch 142. The motion compensation unit 147 uses the reference picture and the motion vector for performing motion compensation processing on the optimal inter prediction mode indicated by the inter prediction mode information. The motion compensation unit 147 supplies the resulting prediction image to the switch 148.

If the intra prediction mode information is supplied from the reversible decoding unit 132, the switch 148 supplies the prediction image supplied from the intra prediction unit 143, to the addition unit 135. On the other hand, if the inter prediction mode information is supplied from the reversible decoding unit 132, the switch 148 supplies the prediction image supplied from the motion compensation unit 147, to the addition unit 135.

(Description of Processing of Decoding Apparatus)

Figure 8:
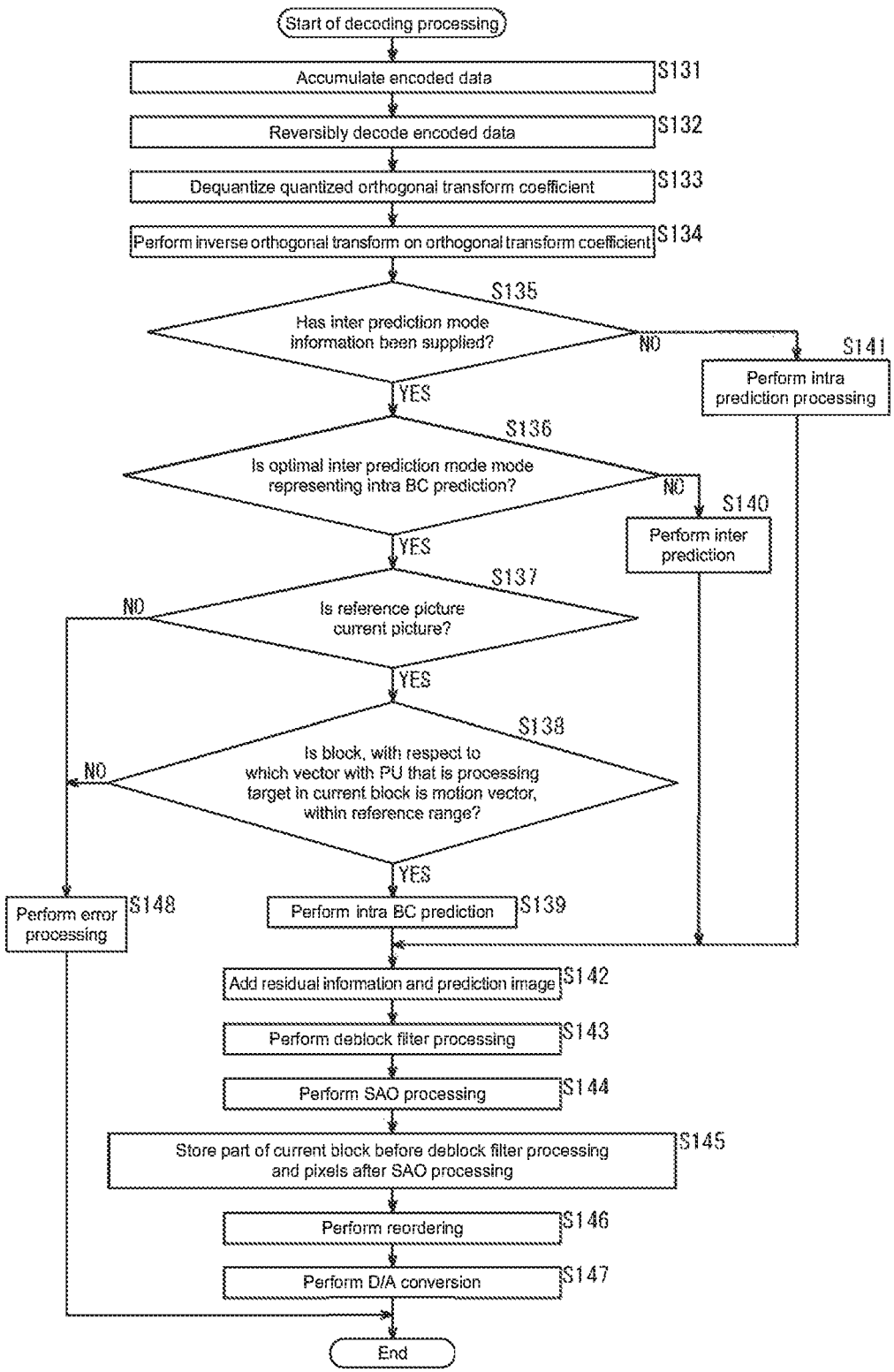
FIG. 8 A flowchart describing decoding processing of the decoding apparatus of FIG. 7.

FIG. 8 is a flowchart describing the decoding processing of the decoding apparatus 130 of FIG. 7.

In Step S131 of FIG. 8, the accumulation buffer 131 of the decoding apparatus 130 receives an encoded stream from the encoding apparatus 70 of FIG. 1 and accumulates it. The accumulation buffer 131 sequentially supplies encoded data of each CU of the accumulated encoded stream, to the reversible decoding unit 132 as encoded data of the current block.

In Step S132, the reversible decoding unit 132 performs reversible decoding such as variable-length decoding and arithmetic decoding corresponding to the reversible encoding of the reversible encoding unit 76 of FIG. 1, on the encoded data from the accumulation buffer 131, to thereby obtain the quantized orthogonal transform coefficient and the encoded information. The reversible decoding unit 132 supplies the quantized orthogonal transform coefficient to the dequantization unit 133. Further, the reversible decoding unit 132 supplies the intra prediction mode information and the like as the encoded information to the intra prediction unit 143 and supplies the reference picture-specifying information, the motion vector, the inter prediction mode information, and the like to the motion compensation unit 147.

In addition, the reversible decoding unit 132 supplies the intra prediction mode information or the inter prediction mode information as the encoded information to the switch 148. The reversible decoding unit 132 supplies the offset filter information as the encoded information to the filter 136.

In Step S133, the dequantization unit 133 dequantizes the quantized orthogonal transform coefficient from the reversible decoding unit 132 and supplies the resulting orthogonal transform coefficient to the inverse orthogonal transform unit 134.

In Step S134, the inverse orthogonal transform unit 134 performs inverse orthogonal transform on the orthogonal transform coefficient from the dequantization unit 133 and supplies the resulting residual information to the addition unit 135. The processing of Steps S136 to S141 and Step S148 is performed on a PU-by-PU basis.

In Step S135, the motion compensation unit 147 determines whether or not inter prediction mode information of a PU that is a processing target has been supplied from the reversible decoding unit 132. If it is in Step S135 determined that the inter prediction mode information has been supplied, the processing proceeds to Step S136.

In Step S136, the motion compensation unit 147 determines whether or not the optimal inter prediction mode represented by the inter prediction mode information of the PU that is the processing target is a mode representing the intra BC prediction. If it is in Step S136 determined that the optimal inter prediction mode is the mode representing the intra BC prediction, the processing proceeds to Step S137.

In Step S137, the motion compensation unit 147 determines whether or not the reference picture is the current picture on the basis of the reference picture-specifying information of the PU that is the processing target, which is supplied from the reversible decoding unit 132.

If it is in Step S137 determined that the reference picture is the current picture, in Step S138, it is determined whether or not a block having a size identical to that of the PU that is the processing target, with respect to which a vector with the PU that is the processing target in the current block is a motion vector supplied from the reversible decoding unit 132, is within the reference range. The reference range is determined by the motion compensation unit 147 on the basis of the current block as in the limiting unit 101.

If it is in Step S138 determined that the block having a size identical to that of the PU that is the processing target, with respect to which the vector with the PU that is the processing target in the current block, is within the reference range, is the motion vector supplied from the reversible decoding unit 132, the processing proceeds to Step S139.

In Step S139, the motion compensation unit 147 reads the current picture from the frame memory 141 on the basis of a PU mode represented by the inter prediction mode information of the PU that is the processing target and the motion vector, to thereby perform intra BC prediction on the PU that is the processing target. The motion compensation unit 147 supplies the resulting prediction image to the switch 148 for causing the processing to proceed to Step S142.

On the other hand, if it is in Step S136 determined that the optimal inter prediction mode is not the mode representing the intra BC prediction, in other words, if the optimal inter prediction mode is the mode representing the inter prediction, the processing proceeds to Step S140.

In Step S140, the motion compensation unit 147 reads the reference picture from the frame memory 141 on the basis of the PU mode represented by the inter prediction mode information of the PU that is the processing target, the reference picture-specifying information, and the motion vector, to thereby perform inter prediction on the PU that is the processing target. The motion compensation unit 147 supplies the resulting prediction image to the switch 148 for causing the processing to proceed to Step S142.

On the other hand, if it is in Step S135 determined that the inter prediction mode information has not been supplied, in other words, if the intra prediction mode information has been supplied to the intra prediction unit 143, the processing proceeds to Step S141.

In Step S141, the intra prediction unit 143 performs intra prediction processing on the optimal intra prediction mode indicated by the intra prediction mode information, on the current block by using the peripheral pixel read from the frame memory 141 via the switch 142. The intra prediction unit 143 supplies prediction images resulting from the intra prediction processing to the addition unit 135 via the switch 148 for causing the processing to proceed to Step S142.

In Step S142, the addition unit 135 adds the residual information supplied from the inverse orthogonal transform unit 134 to the prediction image supplied from the switch 148 to thereby decode the current block. The addition unit 135 supplies the current block resulting from the decoding to the frame memory 141 and the filter 136. The filter 136 retains the current block supplied from the addition unit 135 as the encoded CU.

In Step S143, the filter 136 uses the current block supplied from the addition unit 135 and the adjacent block for performing deblock filter processing on each set of at most three pixels arranged perpendicularly to the boundary about the boundary between the current block and the adjacent block.

In Step S144, the filter 136 performs SAO processing of the type represented by the offset filter information, on the pixels after deblock filter processing by using the offset represented by the offset filter information supplied from the reversible decoding unit 132. The filter 136 supplies the pixels after SAO processing to the frame memory 141 and the screen reordering buffer 139.

In Step S145, the frame memory 141 stores a part of the current block before deblock filter processing, which is supplied from the addition unit 135, and the pixels after SAO processing supplied from the filter 136. A pixel of the pixels before deblock filter processing which have been stored in the frame memory 141, which is adjacent to the PU, is supplied to the intra prediction unit 143 via the switch 142 as the peripheral pixel. Further, the current picture after SAO processing stored in the frame memory 141 and the picture after SAO processing preceding the current picture in the encoding order are output to the motion compensation unit 147 via the switch 142 as the reference picture.

In Step S146, the screen reordering buffer 139 stores the pixels after SAO processing supplied from the filter 136, in units of frames, and reorders the stored pictures in units of frames in the order for encoding, in the original display order. The screen reordering buffer 139 supplies the ordered pictures to the D/A conversion unit 140.

In Step S147, the D/A conversion unit 140 D/A-coverts the picture supplied from the screen reordering buffer 139 and outputs it. Then, the processing ends.

On the other hand, if it is in Step S137 determined that the reference picture is not the current picture or if it is determined that the block having a size identical to that of the PU that is the processing target, with respect to which the vector with the PU that is the processing target in the current block, is not within the reference range, is the motion vector supplied from the reversible decoding unit 132, the processing proceeds to Step S148. In Step S148, the decoding apparatus 130 performs predetermined error processing on the PU that is the processing target and the processing is terminated.

As described above, the decoding apparatus 130 performs intra BC prediction by using the motion vector of the current block limited in such a manner that the region other than the reference range in the current picture is not used for prediction of the current block. Thus, for example, in the intra BC prediction, it is possible to refer to the picture after SAO processing as the reference picture. As a result, it becomes unnecessary to prepare a cache or the like for the reference picture of the intra BC prediction, and it is possible to prevent the memory band, the processing load, and the mounting cost in performing intra BC prediction from increasing.

Note that, although the region 114 whose horizontal or vertical distance from the not yet encoded CU group 113 is within the three pixels is excluded from the reference range in the first embodiment, a region whose horizontal or vertical distance from the not yet encoded CU group 113 is within N-pixels where N is a multiple of four may be excluded from the reference range. In this case, even if the encoding processing and the decoding processing are performed in parallel on a CU-by-CU basis or on a PU-by-PU basis, decoding of the range referable in the intra BC prediction has been completed at the time of encoding of the current block. Therefore, the intra BC prediction can be performed. Thus, it is possible to reduce the processing load by performing encoding processing and the decoding processing in parallel on a CU-by-CU basis or on a PU-by-PU basis.

Second Embodiment (Description of Computer to which Present Disclosure is Applied)

The above-mentioned series of processing may be executed by hardware or may be executed by software. If the series of processing is executed by software, programs that configure that software are installed into a computer. Here, the computer includes a computer incorporated in dedicated hardware, a general-purpose personal computer, for example, capable of executing various functions by installing various programs, and the like.

Figure 9:
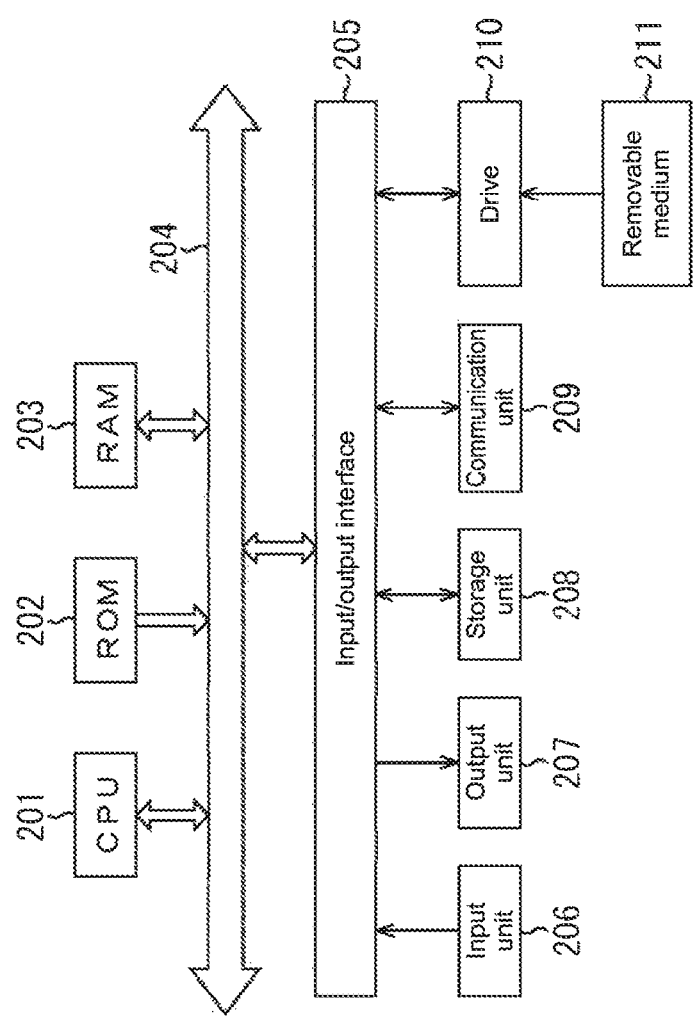
FIG. 9 A block diagram showing a configuration example of hardware of a computer.

FIG. 9 is a block diagram showing a configuration example of hardware of a computer that executes the above-mentioned series of processing in accordance with programs.

In the computer, a CPU (Central Processing Unit) 201, a ROM (Read Only Memory) 202, a RAM (Random Access Memory) 203 are connected to one another with a bus 204.

An input/output interface 205 is further connected to the bus 204. An input unit 206, an output unit 207, a storage unit 208, a communication unit 209, and a drive 210 are connected to the input/output interface 205.

The input unit 206 is constituted by a keyboard, a mouse, a microphone, and the like. The output unit 207 is constituted by a display, a speaker, and the like. The storage unit 208 is constituted by a hard disk, a nonvolatile memory, and the like. The communication unit 209 is constituted by a network interface and the like. The drive 210 drives a removable medium 211 such as a magnetic disk, an optical disc, a magneto-optical disk, and a semiconductor memory.

As described above, in the thus configured computer, for example, the CPU 201 loads programs stored in the storage unit 208 into the RAM 203 via the input/output interface 205 and the bus 204 and executes them. In this manner, the above-mentioned series of processing is performed.

The programs executed by the computer (CPU 201) can be, for example, provided by being recorded on the removable medium 211 that is a package medium or the like. Further, the programs can be provided via a wired or wireless transmission medium such as a local area network, the Internet, and digital satellite broadcasting.

In the computer, the programs can be installed into the storage unit 208 via the input/output interface 205 by the removable medium 211 being mounted on the drive 210. Further, the programs can be received by the communication unit 209 via the wired or wireless transmission medium and installed into the storage unit 208. Otherwise, the programs can be installed into the ROM 202 and the storage unit 208 in advance.

Note that the programs executed by the computer may be programs in which processes are performed chronologically in the order described in the present specification or may be programs in which processes are performed concurrently or at necessary timings, for example, upon calling.

Third Embodiment (Configuration Example of Television Apparatus)

Figure 10:
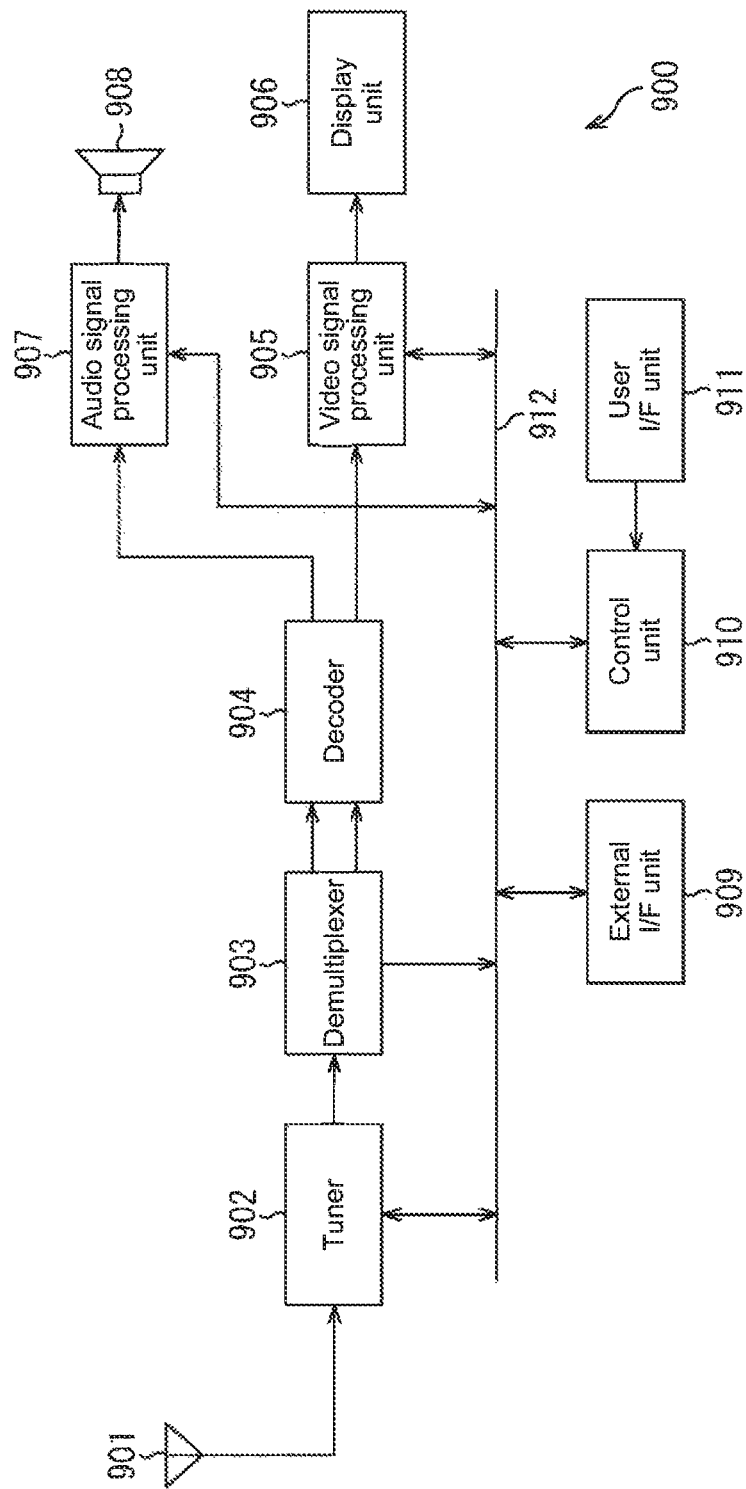
FIG. 10 A diagram showing a schematic configuration example of a television apparatus to which the present disclosure is applied.

FIG. 10 illustrates a schematic configuration of a television apparatus to which the present disclosure is applied. A television apparatus 900 includes an antenna 901, a tuner 902, a demultiplexer 903, a decoder 904, a video signal processing unit 905, a display unit 906, an audio signal processing unit 907, a speaker 908, and an external interface unit 909. In addition, the television apparatus 900 includes a control unit 910, a user interface unit 911, and the like.

The tuner 902 selects a desired channel from broadcast wave signals received by the antenna 901, performs demodulation, and outputs the resulting encoded bitstream to the demultiplexer 903.

The demultiplexer 903 extracts, from the encoded bitstream, video and audio packets of a program that is a viewing target and outputs data of the extracted packets to the decoder 904. Further, the demultiplexer 903 supplies packets of data such as an EPG (Electronic Program Guide) to the control unit 910. Note that, if scrambling is being performed, the scrambling is cancelled by a demultiplexer or the like.

The decoder 904 performs decoding processing of the packets and outputs video data generated by the decoding processing to the video signal processing unit 905 and the audio data generated by the decoding processing to the audio signal processing unit 907.

The video signal processing unit 905 subjects the video data to noise cancelling and video processing or the like depending on user's settings. The video signal processing unit 905 generates video data of a program to be displayed on the display unit 906, image data according to processing based on an application supplied via a network, and the like. Further, the video signal processing unit 905 generates video data for displaying a menu screen or the like to select items, for example, and superimposes it on the video data of the program. The video signal processing unit 905 generates a driving signal on the basis of the thus generated video data for driving the display unit 906.

The display unit 906 drives a display device (e.g., liquid-crystal display element and the like) on the basis of the driving signal from the video signal processing unit 905 for displaying the video and the like of the program.

The audio signal processing unit 907 subjects the audio data to predetermined processing such as noise cancelling, performs D/A conversion processing and amplification processing of the audio data after processing, and supplies it to the speaker 908. In this manner, audio output is performed.

The external interface unit 909 is an interface for connecting to an external apparatus and a network and transmits and receives data such as video data and audio data.

The user interface unit 911 is connected to the control unit 910. The user interface unit 911 is constituted by an operation switch, a remote control signal reception unit, and the like and supplies the control unit 910 with an operation signal corresponding to user's operation.

The control unit 910 is constituted by a CPU (Central Processing Unit), a memory, and the like. The memory stores programs to be executed by the CPU, various types of data required by the CPU for performing processing, EPG data, data acquired via the network, and the like. The programs stored in the memory are read and executed by the CPU at a predetermined timing, for example, upon activation of the television apparatus 900. By executing programs, the CPU controls the respective blocks such that the television apparatus 900 performs operations according to user's operation.

Note that, in the television apparatus 900, a bus 912 is provided for connecting the tuner 902, the demultiplexer 903, the video signal processing unit 905, the audio signal processing unit 907, the external interface unit 909, and the like to the control unit 910.

In the thus configured television apparatus, the decoder 904 is provided with the functions of the decoding apparatus (decoding method) of this application. Thus, it is possible to reduce a processing load in performing intra BC prediction utilizing correlativity in a screen.

Fourth Embodiment (Configuration Example of Mobile Phone)

Figure 11:
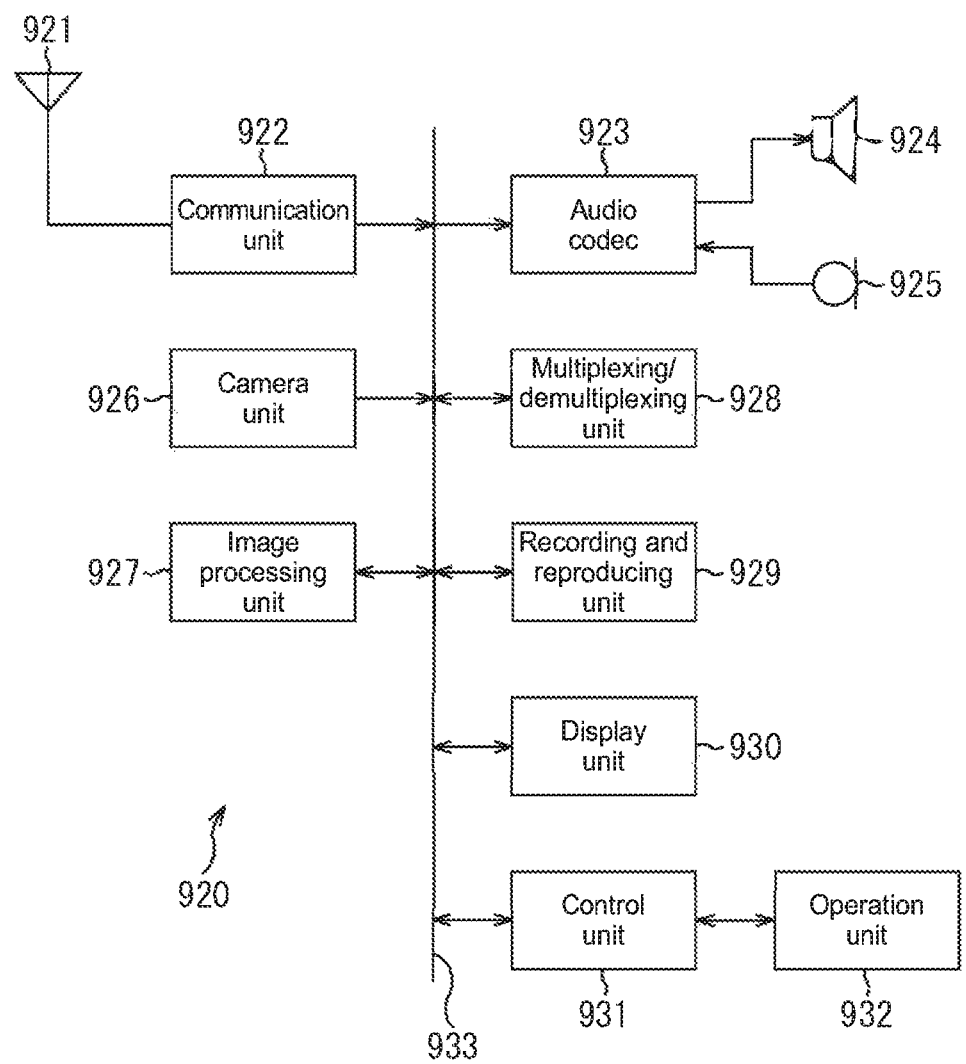
FIG. 11 A diagram showing a schematic configuration example of a mobile phone to which the present disclosure is applied.

FIG. 11 illustrates a schematic configuration of a mobile phone to which the present disclosure is applied. A mobile phone 920 includes a communication unit 922, an audio codec 923, a camera unit 926, an image processing unit 927, a multiplexing/demultiplexing unit 928, a recording and reproducing unit 929, a display unit 930, and a control unit 931. They are connected to one another via a bus 933.

Further, an antenna 921 is connected to the communication unit 922 and a speaker 924 and a microphone 925 are connected to the audio codec 923. In addition, an operation unit 932 is connected to the control unit 931.

The mobile phone 920 performs various operations such as sending/receiving voice signals, sending/receiving e-mail or image data, taking images, and recording data on various modes such as a voice phone mode and a data communication mode.

On the voice phone mode, voice signals generated at the microphone 925 are converted into audio data and subjected to data compression at the audio codec 923 and supplied to the communication unit 922. The communication unit 922 performs modulation processing, frequency conversion processing, and the like on the audio data and generates transmission signals. Further, the communication unit 922 supplies the transmission signals to the antenna 921 and sends them to a base station (not shown). Further, the communication unit 922 performs amplification, frequency conversion processing, demodulation processing, and the like on reception signals received by the antenna 921 and supplies the resulting audio data to the audio codec 923. The audio codec 923 performs data extension on the audio data and convert it into analog voice signals and outputs them to the speaker 924.

Further, for sending mail on the data communication mode, the control unit 931 receives literal-character data input in accordance with an operation of the operation unit 932 and displays an input literal character on the display unit 930. Further, the control unit 931 generates mail data on the basis of a user instruction or the like in the operation unit 932 and supplies it to the communication unit 922. The communication unit 922 performs modulation processing, frequency conversion processing, and the like of the mail data and sends the resulting transmission signals through the antenna 921. Further, the communication unit 922 performs amplification, frequency conversion processing, demodulation processing, and the like on the reception signals received by the antenna 921 and restores the mail data. This mail data is supplied to the display unit 930 for displaying the mail contents.

Note that the mobile phone 92 is also capable of causing a storage medium to store the received mail data in the recording and reproducing unit 929. The storage medium is any rewritable storage medium. For example, the storage medium is a semiconductor memory such as a RAM and a built-in flash memory, a hard disk, a magnetic disk, a magneto-optical disk, an optical disc, a USB (Universal Serial Bus) memory, or a removable medium such as a memory card.

For sending image data on the data communication mode, the image data generated at the camera unit 926 is supplied to the image processing unit 927. The image processing unit 927 performs encoding processing of the image data to generate encoded data.

The multiplexing/demultiplexing unit 928 multiplexes the encoded data generated at the image processing unit 927 and the audio data supplied from the audio codec 923 in accordance with a predetermined system and supplies them to the communication unit 922. The communication unit 922 performs modulation processing, frequency conversion processing, and the like of the multiplexed data and sends the resulting transmission signals through the antenna 921. Further, the communication unit 922 performs amplification, frequency conversion processing, demodulation processing, and the like on the reception signals received by the antenna 921 and restores the multiplexed data. This multiplexed data is supplied to the multiplexing/demultiplexing unit 928. The multiplexing/demultiplexing unit 928 separates the multiplexed data, and supplies the encoded data to the image processing unit 927 and supplies the audio data to the audio codec 923. The image processing unit 927 performs decoding processing of the encoded data to generate image data. This image data is supplied to the display unit 930 for displaying the received image. The audio codec 923 converts the audio data into analog voice signals, supplies them to the speaker 924, and outputs the received audio.

In the thus configured mobile phone apparatus, the image processing unit 927 is provided with the functions of the encoding apparatus and the decoding apparatus (encoding method and decoding method) of this application. Thus, it is possible to reduce a processing load in performing intra BC prediction utilizing correlativity in a screen.

Fifth Embodiment (Configuration Example of Recording and Reproducing Apparatus)

Figure 12:
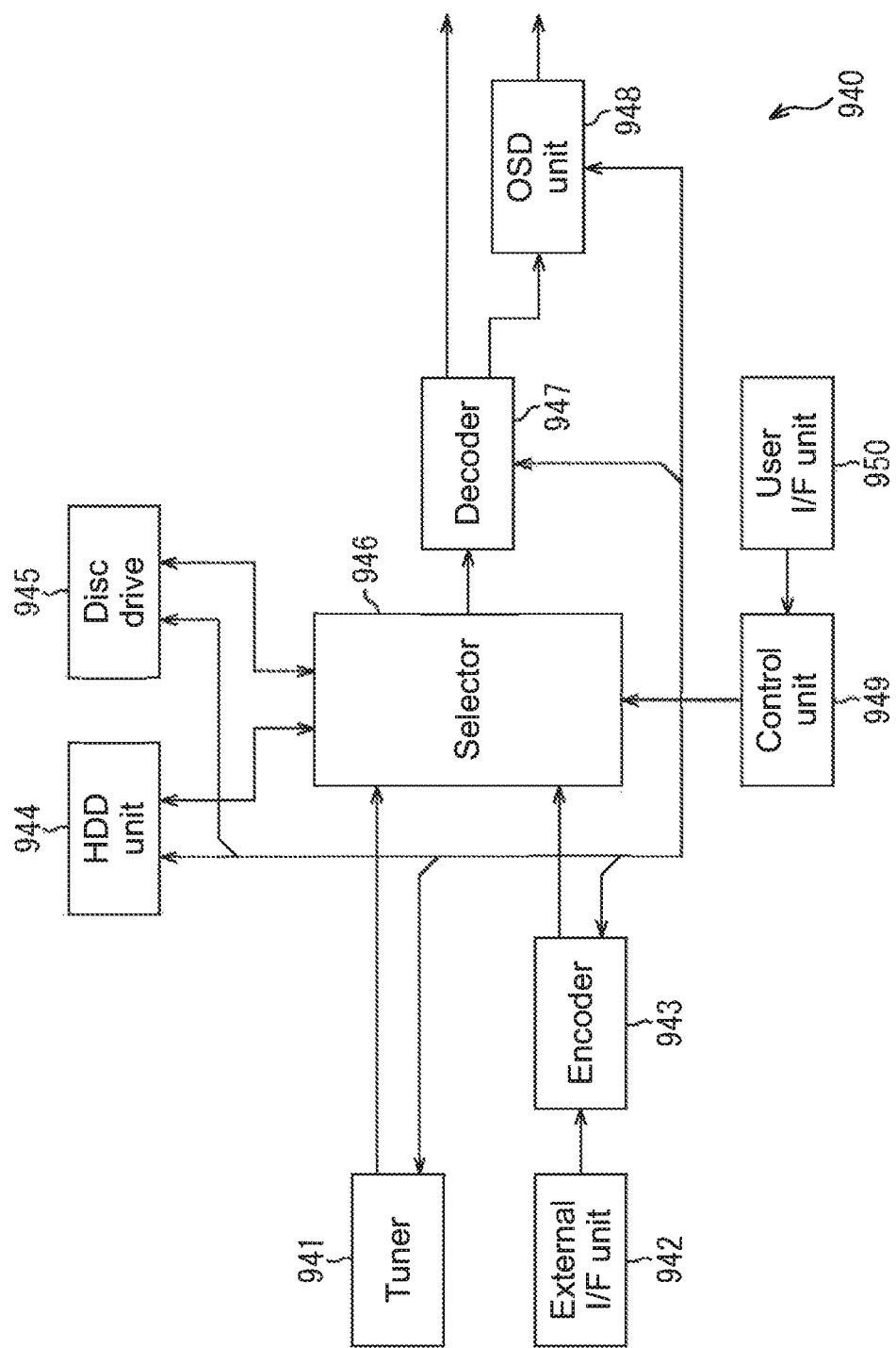
FIG. 12 A diagram showing a schematic configuration example of a recording and reproducing apparatus to which the present disclosure is applied.

FIG. 12 illustrates a schematic configuration of a recording and reproducing apparatus to which the present disclosure is applied. For example, a recording and reproducing apparatus 940 records audio data and video data of a received broadcast program on a recording medium and provides the user with the recorded data at a timing based on user's instruction. Further, for example, the recording and reproducing apparatus 940 is also capable of acquiring audio data and video data from other apparatuses and recording them on the recording medium. In addition, the recording and reproducing apparatus 940 decodes and outputs the audio data and the video data recorded on the recording medium to thereby enable image display and audio output to be performed in a monitor apparatus or the like.

The recording and reproducing apparatus 940 includes a tuner 941, an external interface unit 942, an encoder 943, an HDD (Hard Disk Drive) unit 944, a disc drive 945, a selector 946, a decoder 947, an OSD (On-Screen Display) unit 948, a control unit 949, and a user interface unit 950.

The tuner 941 selects a desired channel from broadcasting signals received by an antenna (not shown). The tuner 941 outputs an encoded bitstream obtained by demodulating the reception signals of the desired channel to the selector 946.

The external interface unit 942 is constituted by at least any of an IEEE1394 interface, a network interface unit, a USB interface, a flash memory interface, and the like. The external interface unit 942 is an interface for connecting to an external apparatus, a network, a memory card, and the like and receives data such as video data, audio data, and the like to be recorded.

If the video data and the audio data supplied from the external interface unit 942 have not been encoded, the encoder 943 performs encoding in accordance with a predetermined system and outputs an encoded bitstream to the selector 946.

The HDD unit 944 records content data such as video and audio, various programs, other data, and the like on a built-in hard disk and reads them from that hard disk upon reproduction or the like.

The disc drive 945 records and reproduces signals with respect to a mounted optical disc. The optical disc is, for example, a DVD disc (DVD-Video, DVD-RAM, DVD-R, DVD-RW, DVD+R, DVD+RW, etc.), Blu-ray (registered trademark) disc, or the like.

The selector 946 selects any encoded bitstream from the tuner 941 or the encoder 943 upon recording of video and audio and supplies it to either one of the HDD unit 944 and the disc drive 945. Further, the selector 946 supplies the encoded bitstream output from the HDD unit 944 or the disc drive 945 to the decoder 947 upon reproduction of video and audio.

The decoder 947 performs decoding processing of the encoded bitstream. The decoder 947 supplies the video data generated by performing decoding processing to the OSD unit 948. Further, the decoder 947 outputs the audio data generated by performing decoding processing.

The OSD unit 948 generates video data for displaying a menu screen or the like to select items, for example, superimposes it on the video data output from the decoder 947, and outputs them.

The user interface unit 950 is connected to the control unit 949. The user interface unit 950 is constituted by an operation switch, a remote control signal reception unit, and the like and supplies an operation signal depending on user's operation to the control unit 949.

The control unit 949 is configured with a CPU, a memory, and the like. The memory stores programs to be executed by the CPU and various types of data required by the CPU for performing processing. The programs stored in the memory are read and executed by the CPU at a predetermined timing, for example, upon activation of the recording and reproducing apparatus 940. By executing programs, the CPU controls the respective blocks such that the recording and reproducing apparatus 940 performs operations according to user's operation.

In the thus configured recording and reproducing apparatus, the encoder 943 is provided with the functions of the encoding apparatus (encoding method) of this application and the decoder 947 is provided with the functions of the decoding apparatus (decoding method) of this application. Thus, it is possible to reduce a processing load in performing intra BC prediction utilizing correlativity in a screen.

Sixth Embodiment (Configuration Example of Imaging Apparatus)

Figure 13:
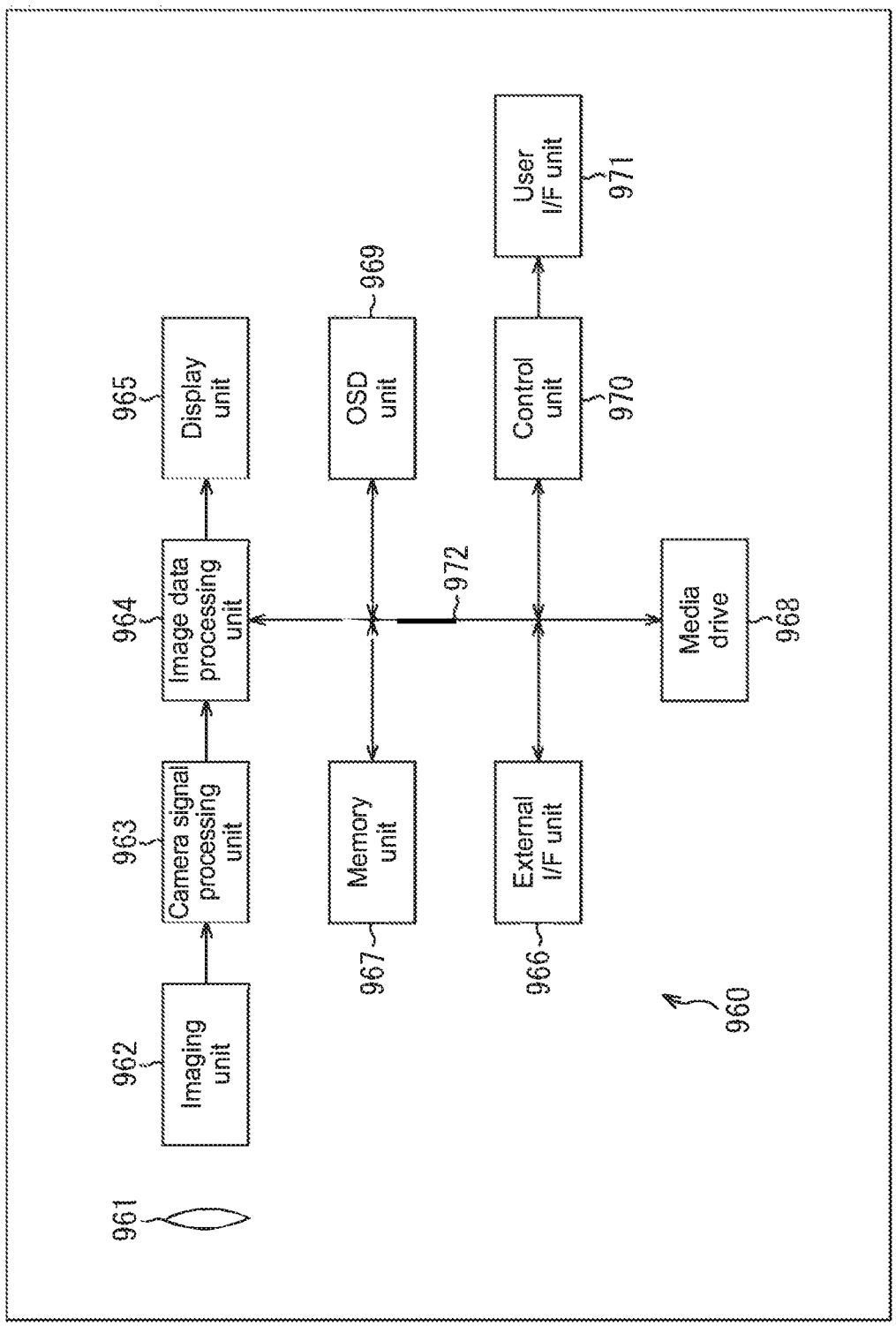
FIG. 13 A diagram showing a schematic configuration example of an imaging apparatus to which the present disclosure is applied.

FIG. 13 illustrates a schematic configuration of an imaging apparatus to which the present disclosure is applied. An imaging apparatus 960 takes an image of an object and causes a display unit to display the image of the object and records it as image data on a recording medium.

The imaging apparatus 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Further, a user interface unit 971 is connected to the control unit 970. In addition, the image data processing unit 964, the external interface unit 966, the memory unit 967, the media drive 968, the OSD unit 969, the control unit 970, and the like are connected via a bus 972.

The optical block 961 is configured with a focus lens, a diaphragm mechanism, and the like. The optical block 961 forms an optical image of the object on an imaging surface of the imaging unit 962. The imaging unit 962 is configured with a CCD or CMOS image sensor and generates electric signals corresponding to the optical image through photoelectric conversion and supplies them to the camera signal processing unit 963.

The camera signal processing unit 963 performs various camera signal processing such as knee correction, gamma correction, and color correction on electric signals supplied from the imaging unit 962. The camera signal processing unit 963 supplies image data after camera signal processing to the image data processing unit 964.

The image data processing unit 964 performs encoding processing of the image data supplied from the camera signal processing unit 963. The image data processing unit 964 supplies the encoded data generated by performing encoding processing to the external interface unit 966 and the media drive 968. Further, the image data processing unit 964 performs decoding processing of the encoded data supplied from the external interface unit 966 and the media drive 968. The image data processing unit 964 supplies the image data generated by performing decoding processing to the display unit 965. Further, the image data processing unit 964 performs processing of supplying the image data supplied from the camera signal processing unit 963 to the display unit 965 and supplies data for display, which is acquired from the OSD unit 969, to the display unit 965 while the data for display is superimposed on the image data.

The OSD unit 969 generates data for display such as a menu screen and an icon formed of symbols, literal characters, or figures and outputs it to the image data processing unit 964.

The external interface unit 966 is constituted by, for example, a USB input/output terminal and the like and connected to a printer when an image is printed. Further, a drive is connected to the external interface unit 966 in a manner that depends on needs, a removable medium such as a magnetic disk and an optical disc is mounted if necessary, a computer programs read from them are installed in a manner that depends on needs. In addition, the external interface unit 966 includes a network interface to be connected to a predetermined network such as a LAN and the Internet. The control unit 970 is capable of reading encoded data from the media drive 968, for example, in accordance with an instruction from the user interface unit 971 and supplying it through the external interface unit 966 to other apparatuses connected via the network. Further, the control unit 970 is capable of acquiring, via the external interface unit 966, encoded data and image data supplied from the other apparatuses via the network and supplying them to the image data processing unit 964, for example.

Any readable and writable removable medium such as a magnetic disk, a magneto-optical disk, an optical disc, and a semiconductor memory can be used as a recording medium to be driven by the media drive 968. Further, regarding the recording medium, the type as the removable medium is also optional and it may be a tape device, may be a disk, or may be a memory card. As a matter of course, it may be a contactless IC (Integrated Circuit) card or the like.

Further, the media drive 968 may be integrated with a recording medium and it may be constituted by a non-transportable storage medium like, for example, a built-in hard disk drive, an SSD (Solid State Drive), etc.

The control unit 970 is configured with the CPU. The memory unit 967 stores programs to be executed by the control unit 970, various types of data required by the control unit 970 for performing processing, and the like. The programs stored in the memory unit 967 are read and executed by the control unit 970 at a predetermined timing, for example, upon activation of the imaging apparatus 960. By executing programs, the control unit 970 controls the respective blocks such that the imaging apparatus 960 performs operations according to user's operation.

In the thus configured imaging apparatus, the image data processing unit 964 is provided with the functions of the encoding apparatus and the decoding apparatus (encoding method and decoding method) of this application. Thus, it is possible to reduce a processing load in performing intra BC prediction utilizing correlativity in a screen.

Seventh Embodiment (Other Examples of Implementation)

Although the examples of the apparatus, the system, and the like to which the present disclosure is applied have been described above, the present disclosure is not limited thereto and can also be implemented as any configuration to be installed into an apparatus that constitutes such an apparatus or system. Examples of this configuration include a processor serving as a system LSI (Large Scale Integration) and the like, a module using a plurality of processors and the like, a unit using a plurality of modules and the like, and a set or the like (i.e., some configurations of the apparatus) obtained by further adding other functions to the unit.

(Configuration Example of Video Set)

An example in implementing the present disclosure as a set will be described with FIG. 14. FIG. 14 shows an example of a schematic configuration of a video set to which the present disclosure is applied.

In recent years, electronic apparatuses are multi-functionalized more and more. For implementing some configurations thereof for sale, provision, or the like in development and manufacture thereof, there are more and more cases where a plurality of configurations having related functions are combined to be implemented as one set having the plurality of functions besides cases where it is implemented as a configuration having one function.

A video set 1300 shown in FIG. 14 is such a multi-functionalized configuration. The video set 1300 is obtained by combining a device having a function related to image encoding and decoding (either one or both are possible) with a device having other functions related to that function.

As shown in FIG. 14, the video set 1300 includes a module group including a video module 1311, an external memory 1312, a power management module 1313, a front-end module 1314, and the like and devices having related functions, such as connectivity 1321, a camera 1322, and a sensor 1323.

A module is a component having united functions which is obtained by unifying some component functions related to one another. A specific physical configuration is optional. For example, one obtained by arranging and unifying a plurality of processors each having a function, an electronic circuit element such as a resistor and a capacitor, other devices, and the like on a wiring board or the like is conceivable. Further, it is also conceivable that other module, processor, and the like are combined with the module and a new module is thus made.

In the case of the example of FIG. 14, the video module 1311 is one obtained by combining configurations having functions related to image processing and includes an application processor, a video processor, a broad band modem 1333, and an RF module 1334.

Processors are obtained by integrating configurations having predetermined functions on a semiconductor chip as a SoC (System On a Chip) and some of them are called, for example, system LSI (Large Scale Integration) or the like. These configurations having predetermined functions may be a logic circuit (hardware configuration), may be a CPU, a ROM, a RAM, and the like and a program (software configuration) to be executed by using them, or may be a combination of both. For example, the processor may include the logic circuit and the CPU, the ROM, the RAM, and the like, such that some of functions are realized by the logic circuit (hardware configuration) and other functions are realized by the program (software configuration) to be executed in the CPU.

An application processor 1331 of FIG. 14 is a processor that executes an application related to image processing. The application to be executed in this application processor 1331 is capable of not only performing arithmetic processing in order to realize a predetermined function but also controlling configurations inside and outside the video module 1311, for example, a video processor 1332 and the like in a manner that depends on needs.

The video processor 1332 is a processor having a function related to (either one or both of) image encoding/decoding.

The broad band modem 1333 is a processor (or module) that performs processing related to wired and/or wireless broad band communication to be performed via the Internet and a broad band line such as a public telephone line network. For example, the broad band modem 1333 converts data (digital signals) to be sent into analog signals by, for example, digital modulation and received analog signals into data (digital signals) by demodulating them. For example, the broad band modem 1333 is capable of digitally modulating and demodulating any information such as image data to be processed by the video processor 1332, a stream obtained by encoding the image data, an application program, and setting data.

The RF module 1334 is a module that performs frequency conversion, modulation/demodulation, amplification, filter processing, and the like on RF (Radio Frequency) signals to be sent and received via an antenna. For example, the RF module 1334 performs frequency conversion and the like on base band signals generated by the broad band modem 1333 to thereby generate RF signals. Further, for example, the RF module 1334 performs frequency conversion and the like on RF signals received via the front-end module 1314 to thereby generate base band signals.

Note that, as shown by a dotted line 1341 in FIG. 14, the application processor 1331 and the video processor 1332 may be integrated and configured as one processor.

The external memory 1312 is a module including a storage device to be utilized by the video module 1311, which is provided outside the video module 1311. The storage device of this external memory 1312 can be realized by any physical configuration. In general, it is often utilized for storing large-volume data like image data in units of frames. Therefore, for example, it is desirable to realize it by a relatively inexpensive, large-capacity semiconductor memory like a DRAM (Dynamic Random Access Memory).

The power management module 1313 manages and controls supply of power to the video module 1311 (respective configurations within the video module 1311).

The front-end module 1314 is a module that provides the RF module 1334 with front-end functions (circuits at transmission and reception ends on an antenna side). As shown in FIG. 14, the front-end module 1314 includes, for example, an antenna unit 1351, a filter 1352, and an amplification unit 1353.

The antenna unit 1351 includes an antenna that sends/receives radio signals and peripheral configurations. The antenna unit 1351 sends signals supplied from the amplification unit 1353 as radio signals and supplies the received radio signals to the filter 1352 as electric signals (RF signals). The filter 1352 performs filter processing and the like on the RF signals received via the antenna unit 1351 and supplies the RF module 1334 with the RF signals after processing. The amplification unit 1353 amplifies the RF signals supplied from the RF module 1334 and supplies them to the antenna unit 1351.

The connectivity 1321 is a module having a function related to external connection. A physical configuration of the connectivity 1321 is optional. For example, the connectivity 1321 includes a configuration having a communication function other than communication standards covered by the broad band modem 1333, an external input/output terminal, and the like.

For example, the connectivity 1321 may include a module having a communication function complying with wireless communication standards such as Bluetooth (registered trademark), IEEE 802.11 (e.g., Wi-Fi (Wireless Fidelity, registered trademark)), NFC (Near Field Communication), and IrDA (Infrared Data Association), an antenna that sends/receives signals complying with such standards, and the like. Further, for example, the connectivity 1321 may include a module having a communication function complying with wired communication standards such as USB (Universal Serial Bus) and HDMI (registered trademark) (High-Definition Multimedia Interface) and a terminal complying with such standards. In addition, for example, the connectivity 1321 may have a transmission function and the like of other data (signals) of an analog input/output terminal and the like.

Note that the connectivity 1321 may include a device that is a transmission destination of data (signals). For example, the connectivity 1321 may include a drive that reads and writes of data from/on a recording medium such as a magnetic disk, an optical disc, a magneto-optical disk, and a semiconductor memory (including not only a drive of a removable medium but also a hard disk, SSD (Solid State Drive), NAS (Network Attached Storage), and the like). Further, the connectivity 1321 may include output devices of images and sound (monitor, speaker, and the like).

The camera 1322 is a module having a function of photographing an object and obtaining image data of the object. The image data obtained by photographing of the camera 1322 is supplied to the video processor 1332 and encoded, for example.

The sensor 1323 is a module having a function of any sensor, for example, a sound sensor, a ultrasonic sensor, a photosensor, an illuminance sensor, an infrared sensor, an image sensor, a rotation sensor, an angle sensor, an angular velocity sensor, a speed sensor, an acceleration sensor, a tilt sensor, a magnetic pattern recognition sensor, a shock sensor, or a temperature sensor. Data detected by the sensor 1323 is, for example, supplied to the application processor 1331 and utilized in accordance with an application or the like.

The configurations described above as the modules may be realized as processors or the configurations described above as the processors may be realized as modules conversely.

In the video set 1300 having the configurations as described above, the present disclosure can be applied to the video processor 1332 as will be described later. Therefore, the video set 1300 can be implemented as a set to which the present disclosure is applied.

(Configuration Example of Video Processor)

FIG. 15 shows an example of a schematic configuration of the video processor 1332 (FIG. 14) to which the present disclosure is applied.

In the case of the example of FIG. 15, the video processor 1332 has a function of receiving input of video signals and audio signals and encoding them in accordance with a predetermined system and a function of decoding the encoded video data and audio data and reproducing and outputting video signals and audio signals.

As shown in FIG. 15, the video processor 1332 includes a video input processing unit 1401, a first image enlarging/reducing unit 1402, a second image enlarging/reducing unit 1403, a video output processing unit 1404, a frame memory 1405, and a memory control unit 1406. Further, the video processor 1332 includes an encode/decode engine 1407, video ES (Elementary Stream) buffers 1408A and 1408B, and audio ES buffers 1409A and 1409B. In addition, the video processor 1332 includes an audio encoder 1410, an audio decoder 1411, a multiplexer (MUX) 1412, a demultiplexer (DMUX) 1413, and a stream buffer 1414.

The video input processing unit 1401 acquires, for example, video signals input from the connectivity 1321 (FIG. 14) or the like and converts them into digital image data. The first image enlarging/reducing unit 1402 performs format conversion, image enlarging/reducing processing, and the like on the image data. The second image enlarging/reducing unit 1403 performs image enlarging/reducing processing on the image data in a manner that depends on a format at an output destination via the video output processing unit 1404 and performs format conversion, image enlarging/reducing processing, and the like as in the first image enlarging/reducing unit 1402. The video output processing unit 1404 performs format conversion on the image data, converts it into analog signals, and so on, and outputs them as reproduced video signals to the connectivity 1321 (FIG. 14) and the like, for example.

The frame memory 1405 is a memory for image data shared with the video input processing unit 1401, the first image enlarging/reducing unit 1402, the second image enlarging/reducing unit 1403, the video output processing unit 1404, and the encode/decode engine 1407. The frame memory 1405 is, for example, realized as a semiconductor memory such as a DRAM.

The memory control unit 1406 receives a synchronization signal from the encode/decode engine 1407 and controls access for writing and reading on/from the frame memory 1405 in accordance with a schedule of access to the frame memory 1405, which is written on an access management table 1406A. The access management table 1406A is updated by the memory control unit 1406 in accordance with processing to be executed by the encode/decode engine 1407, the first image enlarging/reducing unit 1402, the second image enlarging/reducing unit 1403, and the like.

The encode/decode engine 1407 performs encode processing of image data and performs decode processing of a video stream that is data obtained by encoding the image data. For example, the encode/decode engine 1407 encodes image data read from the frame memory 1405 and sequentially writes it on the video ES buffer 1408A as video streams. Further, for example, the video streams are sequentially read from the video ES buffer 1408B and decoded and sequentially written on the frame memory 1405 as image data. The encode/decode engine 1407 uses the frame memory 1405 as a working region in encoding and decoding them. Further, the encode/decode engine 1407 outputs a synchronization signal to the memory control unit 1406 at a timing for starting processing for each macroblock, for example.

The video ES buffer 1408A buffers a video stream generated by the encode/decode engine 1407 and supplies it to the multiplexer (MUX) 1412. The video ES buffer 1408B buffers a video stream supplied from the demultiplexer (DMUX) 1413 and supplies it to the encode/decode engine 1407.

The audio ES buffer 1409A buffers the audio stream generated by the audio encoder 1410 and supplies it to the multiplexer (MUX) 1412. The audio ES buffer 1409B buffers the audio stream supplied from the demultiplexer (DMUX) 1413 and supplies it to the audio decoder 1411.

The audio encoder 1410, for example, digitally converts audio signals input from, for example, the connectivity 1321 (FIG. 14) or the like and encodes them in accordance with, for example, a predetermined system such as an MPEG audio system and an AC3 (Audio Code number 3) system. The audio encoder 1410 sequentially writes audio streams that are data obtained by encoding the audio signals, on the audio ES buffer 1409A. The audio decoder 1411 decodes the audio streams supplied from the audio ES buffer 1409B, for example, converts them into analog signals and so on, and supplies them to, for example, the connectivity 1321 (FIG. 14) or the like as reproduced audio signals.

The multiplexer (MUX) 1412 multiplexes the video stream with the audio stream. A method of this multiplexing (i.e., format of bitstream generated by multiplexing) is optional. Further, in this multiplexing, the multiplexer (MUX) 1412 is also capable of adding predetermined header information and the like to a bitstream. That is, the multiplexer (MUX) 1412 is capable of converting the format of a stream by multiplexing. For example, the multiplexer (MUX) 1412 multiplexes the video stream with the audio stream to thereby convert them into a transport stream that is a bitstream in a format for transferring. Further, for example, the multiplexer (MUX) 1412 multiplexes the video stream with the audio stream to thereby convert them into data (file data) in a file format for recording.

The demultiplexer (DMUX) 1413 demultiplexes the bitstream obtained by multiplexing the video stream with the audio stream, in accordance with a method corresponding to multiplexing by the multiplexer (MUX) 1412. That is, the demultiplexer (DMUX) 1413 extracts the video stream and the audio stream from the bitstream read from the stream buffer 1414 (separates the video stream and the audio stream from each other). That is, the demultiplexer (DMUX) 1413 is capable of converting the format of the stream by demultiplexing (inverse conversion of the conversion by the multiplexer (MUX) 1412). For example, the demultiplexer (DMUX) 1413 is capable of acquiring the transport stream supplied from, for example, the connectivity 1321, the broad band modem 1333 or the like (both in FIG. 14) via the stream buffer 1414 and demultiplexing it, to thereby convert it into the video stream and the audio stream. Further, for example, the demultiplexer (DMUX) 1413 is capable of acquiring file data read from various recording media by, for example, the connectivity 1321 (FIG. 14) via the stream buffer 1414 and demultiplexing it, to thereby convert it into the video stream and the audio stream.

The stream buffer 1414 buffers the bitstream. For example, the stream buffer 1414 buffers the transport stream supplied from the multiplexer (MUX) 1412 and supplies it to, for example, the connectivity 1321 and the broad band modem 1333 (both in FIG. 14) or the like at a predetermined timing or on the basis of a request and the like from the outside.

Further, for example, the stream buffer 1414 buffers the file data supplied from the multiplexer (MUX) 1412 and supplies it at a predetermined timing or on the basis of a request or the like from the outside, to, for example, the connectivity 1321 (FIG. 14) and the like for recording it on the various recording media.

In addition, the stream buffer 1414 buffers the transport stream acquired via, for example, the connectivity 1321 and the broad band modem 1333 or the like (both in FIG. 14) and supplies it to the demultiplexer (DMUX) 1413 at a predetermined timing or on the basis of a request or the like from the outside.

Further, the stream buffer 1414 buffers the file data read from the various recording media in, for example, the connectivity 1321 (FIG. 14) or the like and supplies it to the demultiplexer (DMUX) 1413 at a predetermined timing or on the basis of a request or the like from the outside.

Next, an example of the operation of the video processor 1332 having such a configuration will be described. For example, video signals input into the video processor 1332 from the connectivity 1321 (FIG. 14) or the like are converted into digital image data according to a predetermined system such as a 4:2:2Y/Cb/Cr system in the video input processing unit 1401 and sequentially written on the frame memory 1405. This digital image data is read by the first image enlarging/reducing unit 1402 or the second image enlarging/reducing unit 1403, subjected to format conversion into the predetermined system such as the 4:2:0Y/Cb/Cr system and enlarging/reducing processing, and written on the frame memory 1405 again. This image data is encoded by the encode/decode engine 1407 and written on the video ES buffer 1408A as a video stream.

Further, audio signals input into the video processor 1332 from the connectivity 1321 (FIG. 14) or the like are encoded by the audio encoder 1410 and written on the audio ES buffer 1409A as the audio stream.

The video stream of the video ES buffer 1408A and the audio stream of the audio ES buffer 1409A are read and multiplexed by the multiplexer (MUX) 1412 and converted into a transport stream, file data, or the like. The transport stream generated by the multiplexer (MUX) 1412 is buffered by the stream buffer 1414, and then output to an external network via, for example, the connectivity 1321 and the broad band modem 1333 (both in FIG. 14) or the like. Further, the file data generated by the multiplexer (MUX) 1412 is buffered by the stream buffer 1414, and then output to, for example, the connectivity 1321 (FIG. 14) or the like for recording it on the various recording media.

Further, the transport stream input into the video processor 1332 from the external network via, for example, the connectivity 1321 and the broad band modem 1333 (both in FIG. 14) or the like is buffered by the stream buffer 1414 and demultiplexed by the demultiplexer (DMUX) 1413. Further, the file data read from the various recording media in, for example, the connectivity 1321 (FIG. 14) or the like and input into the video processor 1332 is buffered by the stream buffer 1414, and then demultiplexed by the demultiplexer (DMUX) 1413. That is, the transport stream or the file data input into the video processor 1332 is separated into the video stream and the audio stream by the demultiplexer (DMUX) 1413.

The audio stream is supplied to the audio decoder 1411 via the audio ES buffer 1409B and decoded, and audio signals are reproduced. Further, the video stream is written on the video ES buffer 1408B, and then sequentially read and decoded by the encode/decode engine 1407, and written on the frame memory 1405. The decoded image data is subjected to enlarging/reducing processing by the second image enlarging/reducing unit 1403 and written on the frame memory 1405. Then, the decoded image data is read by the video output processing unit 1404, subjected to format conversion into a predetermined system such as a 4:2:2Y/Cb/Cr system, and, in addition, converted into analog signals. Then, video signals are reproduced and output.

In a case where the present disclosure is applied to the thus configured video processor 1332, the present disclosure associated with the above-mentioned respective embodiments only needs to be applied to the encode/decode engine 1407. That is, for example, the encode/decode engine 1407 only needs to have the functions of the encoding apparatus and the decoding apparatus according to the first to third embodiments. By doing so, the video processor 1332 can obtain effects similar to the effects described above with reference to FIGS. 1 to 8.

Note that, in the encode/decode engine 1407, the present disclosure (i.e., functions of the encoding apparatus and the decoding apparatus according to the above-mentioned respective embodiments) may be realized by hardware such as a logic circuit, may be realized by software such as an incorporated program, or may be realized by both of them.

(Another Configuration Example of Video Processor)

FIG. 16 shows another example of the schematic configuration of the video processor 1332 (FIG. 14) to which the present disclosure is applied. In the case of the example of FIG. 16, the video processor 1332 has functions of encoding and decoding video data in accordance with a predetermined system.

More specifically, as shown in FIG. 16, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexer/demultiplexer (MUX DMUX) 1518, a network interface 1519, and a video interface 1520.

The control unit 1511 controls operations of the respective processing units within the video processor 1332, such as the display interface 1512, the display engine 1513, the image processing engine 1514, and the codec engine 1516.

As shown in FIG. 16, the control unit 1511 includes, for example, a main CPU 1531, a sub-CPU 1532, and a system controller 1533. The main CPU 1531 executes a program and the like for controlling operations of the respective processing units within the video processor 1332. The main CPU 1531 generates a control signal in accordance with that program and the like and supplies it to the respective processing units (i.e., controls operations of the respective processing units). The sub-CPU 1532 serves to assist the main CPU 1531. For example, the sub-CPU 1532 executes child processes, subroutine, and the like of programs and the like to be executed by the main CPU 1531. The system controller 1533 controls operations of the main CPU 1531 and the sub-CPU 1532, for example, designating programs to be executed by the main CPU 1531 and the sub-CPU 1532.

Under the control of the control unit 1511, the display interface 1512 outputs image data to, for example, the connectivity 1321 (FIG. 14) or the like. For example, the display interface 1512 converts image data that is digital data into analog signals and outputs them to a monitor apparatus or the like of the connectivity 1321 (FIG. 14) as reproduced video signals or outputs still as the image data that is digital data.

Under the control of the control unit 1511, the display engine 1513 performs various types of conversion processing such as format conversion, size conversion, and color gamut conversion on the image data such that it conforms to hardware specifications of the monitor apparatus or the like that displays that image.

Under the control of the control unit 1511, the image processing engine 1514 performs predetermined image processing such as filter processing for improving the image quality, for example, on the image data.

The internal memory 1515 is a memory provided inside the video processor 1332, which is shared with the display engine 1513, the image processing engine 1514, and the codec engine 1516. The internal memory 1515 is, for example, utilized for exchanging data among the display engine 1513, the image processing engine 1514, and the codec engine 1516. For example, the internal memory 1515 stores data supplied from the display engine 1513, the image processing engine 1514, or the codec engine 1516 and supplies that data to the display engine 1513, the image processing engine 1514, or the codec engine 1516 in a manner that depends on needs (e.g., in response to a request). This internal memory 1515 may be realized by any storage device. In general, it is often utilized for storing small-volume data such as image data in units of blocks and parameters. Therefore, for example, it is desirable to realize it by a semiconductor memory having a relatively (e.g., in comparison with the external memory 1312) small capacity but a high response speed like an SRAM (Static Random Access Memory).

The codec engine 1516 performs processing related to encoding and decoding of image data. Any system can be used as the encoding/decoding system covered by this codec engine 1516 and the number thereof may be one or may be plural. For example, the codec engine 1516 may have a codec function of a plurality of encoding/decoding systems and may perform encoding of image data or decoding of encoded data by using one selected from among them.

In the example shown in FIG. 16, the codec engine 1516 includes, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of processing related to the codec.

The MPEG-2 Video 1541 is a functional block that encodes and decodes image data in accordance with an MPEG-2 system. The AVC/H.264 1542 is a functional block that encodes and decodes image data in accordance with an AVC/H.264 system. The HEVC/H.265 1543 is a functional block that encodes and decodes image data in accordance with HEVC. The HEVC/H.265 (Scalable) 1544 is a functional block that scalably encodes and scalably decodes image data in accordance with the HEVC. The HEVC/H.265 (Multi-view) 1545 is a functional block that performs multi-view encoding and multi-view decoding on image data in accordance with the HEVC.

The MPEG-DASH 1551 is a functional block that sends/receives image data in accordance with an MPEG-DASH (MPEG-Dynamic Adaptive Streaming over HTTP) system. The MPEG-DASH is a technique for streaming video by the use of HTTP (Hyper Text Transfer Protocol). The MPEG-DASH has, as one of features, selecting and transmitting suitable one from a plurality of pieces of encoded data different from one another in resolutions, which are prepared in advance, in units of segments. The MPEG-DASH 1551 generates a stream compatible with the standards, performs transmission control or the like of that stream, and encodes/decodes image data by utilizing the above-mentioned MPEG-2 Video 1541 to HEVC/H.265 (Multi-view) 1545.

The memory interface 1517 is an interface for the external memory 1312. Data supplied from the image processing engine 1514 and the codec engine 1516 is supplied to the external memory 1312 via the memory interface 1517. Further, the data read from the external memory 1312 is supplied to the video processor 1332 (image processing engine 1514 or codec engine 1516) via the memory interface 1517.

The multiplexer/demultiplexer (MUX DMUX) 1518 performs multiplexing and demultiplexing of various types of data related to an image such as a bitstream of encoded data, image data, and a video signal. Any method can be employed for this multiplexing/demultiplexing. For example, in multiplexing, the multiplexer/demultiplexer (MUX DMUX) 1518 is capable of not only unifying a plurality of pieces of data but also adding predetermined header information and the like to that data. Further, in demultiplexing, the multiplexer/demultiplexer (MUX DMUX) 1518 is capable of not only separating a single piece of data into a plurality of pieces of data but also adding predetermined header information and the like to each of the separated pieces of data. That is, the multiplexer/demultiplexer (MUX DMUX) 1518 is capable of converting the format of the data by multiplexing/demultiplexing. For example, the multiplexer/demultiplexer (MUX DMUX) 1518 is capable of multiplexing a bitstream to thereby convert it into a transport stream that is a bitstream in a format for transferring or data (file data) in a file format for recording. As a matter of course, inverse conversion thereof is also possible by demultiplexing.

The network interface 1519 is, for example, an interface for the broad band modem 1333 and the connectivity 1321 (both in FIG. 14) or the like. The video interface 1520 is an interface for, for example, the connectivity 1321 and the camera 1322 (both in FIG. 14) or the like.

Next, an example of the operation of such a video processor 1332 will be described. For example, when receiving a transport stream from the external network via the connectivity 1321 and the broad band modem 1333 (both in FIG. 14) or the like, that transport stream is supplied to the multiplexer/demultiplexer (MUX DMUX) 1518 via the network interface 1519 and demultiplexed. Then, the transport stream is decoded by the codec engine 1516. The image data obtained by decoding of the codec engine 1516 is, for example, subjected to predetermined image processing by the image processing engine 1514. Predetermined conversion is performed thereon by the display engine 1513 and supplied to, for example, the connectivity 1321 (FIG. 14) or the like via the display interface 1512. Then, that image is displayed on a monitor. Further, for example, image data obtained by decoding of the codec engine 1516 is re-encoded by the codec engine 1516. The re-encoded image data is multiplexed by the multiplexer/demultiplexer (MUX DMUX) 1518 and converted into the file data. The converted file data is output to, for example, the connectivity 1321 (FIG. 14) or the like via the video interface 1520. Then, the file data is recorded on the various recording media.

In addition, file data that is encoded data of image data, which is read from a recording medium (not shown) by, for example, the connectivity 1321 (FIG. 14) or the like, is supplied to the multiplexer/demultiplexer (MUX DMUX) 1518 via the video interface 1520 and demultiplexed. Then, the file data is decoded by the codec engine 1516. The image data obtained by decoding of the codec engine 1516 is subjected to predetermined image processing by the image processing engine 1514. Predetermined conversion is performed thereon by the display engine 1513 and supplied to for example, the connectivity 1321 (FIG. 14) or the like via the display interface 1512. Then, that image is displayed on the monitor. Further, for example, the image data obtained by decoding of the codec engine 1516 is re-encoded by the codec engine 1516. The re-encoded image data is multiplexed by the multiplexer/demultiplexer (MUX DMUX) 1518 and converted into a transport stream. The converted image data is supplied to, for example, the connectivity 1321 and the broad band modem 1333 (both in FIG. 14) or the like and transmitted to other apparatuses (not shown) via the network interface 1519.

Note that exchange of image data and other data among the respective processing units within the video processor 1332 is performed by utilizing, for example, the internal memory 1515 and the external memory 1312. Further, the power management module 1313 controls supply of power to, for example, the control unit 1511.

In a case where the present disclosure is applied to the thus configured video processor 1332, the present disclosure associated with the above-mentioned respective embodiments only needs to be applied to the codec engine 1516. That is, for example, the codec engine 1516 only needs to have functional blocks that realize the encoding apparatus and the decoding apparatus according to the first to third embodiments. By the codec engine 1516 doing so, the video processor 1332 can obtain effects similar to the effects described above with reference to FIGS. 1 to 8.

Note that, in the codec engine 1516, the present disclosure (i.e., functions of the encoding apparatus and the decoding apparatus according to the above-mentioned respective embodiments) may be realized by hardware such as a logic circuit, may be realized by software such as an incorporated program, or may be realized by both of them.

Hereinabove, the two examples of the configuration of the video processor 1332 have been shown. However, any configuration can be employed for the video processor 1332 and those other than the above-mentioned two examples may be employed. Further, although this video processor 1332 may be configured as the single semiconductor chip, the video processor 1332 may be configured as a plurality of semiconductor chips. For example, it may be a three-dimensional stacked LSI in which a plurality of semiconductors are stacked. Further, it may be realized by a plurality of LSIs.

(Application Example to Apparatus)

The video set 1300 can be incorporated in various apparatuses that process image data. For example, the video set 1300 can be incorporated in the television apparatus 900 (FIG. 10), the mobile phone 920 (FIG. 11), the recording and reproducing apparatus 940 (FIG. 12), the imaging apparatus 960 (FIG. 13), and the like. By incorporating the video set 1300, that apparatus can obtain effects similar to the effects described above with reference to FIGS. 1 to 8.

Note that even a part of each configuration of the above-mentioned video set 1300 can be implemented as a configuration to which the present disclosure is applied as long as it includes the video processor 1332. For example, only the video processor 1332 can be implemented as a video processor to which the present disclosure is applied. Further, for example, the processor, the video module 1311, and the like shown in the dotted line 1341 can be implemented as processor, module, and the like to which the present disclosure is applied as described above. In addition, for example, the video module 1311, the external memory 1312, the power management module 1313, and the front-end module 1314 can also be combined and implemented as a video unit 1361 to which the present disclosure is applied. With any configuration, effects similar to the effects described above with reference to FIGS. 1 to 8 can be obtained.

That is, any configuration can be incorporated in various apparatuses that process image data as in the case of the video set 1300 as long as it includes the video processor 1332. For example, the video processor 1332, the processor, video module 1311 shown in the dotted line 1341, or the video unit 1361 can be incorporated in the television apparatus 900 (FIG. 10), the mobile phone 920 (FIG. 11), the recording and reproducing apparatus 940 (FIG. 12), the imaging apparatus 960 (FIG. 13), and the like. Further, by incorporating any configuration to which the present disclosure is applied, that apparatus can obtain effects similar to the effects described above with reference to FIGS. 1 to 8 as in the case of the video set 1300.

Note that, in the present specification, the example in which various types of information are multiplexed with the encoded data and transmitted from the encoder side to the decoder side has been described. However, a technique for transmitting these pieces of information is not limited to such an example. For example, these pieces of information may be transmitted or recorded as separate data associated with the encoded data without being multiplexed with the encoded data. Here, the term of "associated" means that an image (may be a part of the image, such as a slice and a block) of a bitstream and information corresponding to that image can be linked to each other during decoding. That is, information may be transmitted through a transmission channel different from that used by the encoded data. Further, information may be recorded on a recording medium different from that used by the encoded data (or another recording area of an identical recording medium). In addition, the information and the encoded data may be associated with each other in arbitrary units, for example, a plurality of frames, one frame, a part of a frame, or the like.

The present disclosure can be applied to an encoding apparatus and a decoding apparatus to be used when receiving a bitstream compressed by orthogonal transform such as discrete cosine transform and motion compensation like MPEG, H.26x, or the like via a network medium such as satellite broadcasting, a cable TV, the Internet, and a mobile phone or when processing it on a storage medium like an optical, magnetic disk and a flash memory.

Further, in the present specification, the system means collection of a plurality of components (apparatus, module (component), etc.) and it does not matter whether or not all the elements of the configuration are within an identical casing. Therefore, a plurality of apparatuses housed in separate casings and connected via a network and a single apparatus with a plurality of modules being housed in a single casing are both the systems.

In addition, the effects described in the present specification are merely illustrative and not limitative and other effects may be given.

Further, embodiments of the present disclosure are not limited to the above-mentioned embodiments and various modifications can be made without departing from the gist of the present disclosure.

For example, the present disclosure can take a cloud computing configuration in which a single function is shared and cooperatively processed by a plurality of apparatuses via a network.

Further, the respective steps described above with reference to the above-mentioned flowcharts can be shared and executed by a plurality of apparatuses besides being executed by a single apparatus.

In addition, if a single step includes a plurality of processes, the plurality of processes of the single step can be shared and executed by a plurality of apparatuses besides being executed by a single apparatus.

The present disclosure can also take the following configurations.

(1)

An image processing apparatus, including a limiting unit that limits a motion vector of a current block to be used for prediction utilizing correlativity in a screen, in such a manner that a peripheral pixel of the current block is not used for the prediction of the current block.

(2)

The image processing apparatus according to (1), further including a predicting unit that performs the prediction on the basis of the motion vector limited by the limiting unit by using a reference range not including the peripheral pixel within the screen including the current block.

(3)

The image processing apparatus according to (2), configured such that the peripheral pixel is a pixel whose horizontal or vertical distance from a region within the screen, which has not yet been encoded during encoding of the current block, is within a predetermined range.

(4)

The image processing apparatus according to (3), configured such that the predicting unit performs the prediction by using an image of the reference range after deblock filter processing and SAO (Sample adaptive offset) processing.

(5)

The image processing apparatus according to (4), configured such that the predetermined range is within three pixels.

(6)

The image processing apparatus according to (3), configured such that the predetermined range is within N-pixels where N is a multiple of four.

(7)

The image processing apparatus according to any of (1) to (6), configured such that the current block is a CU (Coding Unit).

(8)

An image processing method, including:

a limiting step of limiting, by an image processing apparatus, a motion vector of a current block to be used for prediction utilizing correlativity in a screen, in such a manner that a peripheral pixel of the current block is not used for the prediction of the current block.

REFERENCE SIGNS LIST

70 encoding apparatus, 101 limiting unit, 103 predicting unit

The invention claimed is:

1. An image processing apparatus, comprising:

a hardware processor configured to:

set a reference range within a picture for detection of a motion vector of a current block within the picture, wherein a boundary region, within a first region of the picture, is excluded from the reference range for prediction of the current block, the boundary region is along a boundary between the first region and an entirety of a second region in the picture, and the first region is an encoded region and the second region is a non-encoded region;

detect the motion vector of the current block within the picture based on the reference range;

predict the current block based on the detected motion vector and a correlativity in the picture, wherein one of a horizontal distance of the boundary region or a vertical distance of the boundary region from the non-encoded region is within a specific range, and the specific range is within three pixels; and predict the current block after a deblock filter process and a Sample Adaptive Offset (SAO) process.

2. The image processing apparatus according to claim 1, wherein the specific range is within N-pixels, and N is a multiple of four.

3. The image processing apparatus according to claim 1, wherein the current block is a Coding Unit (CU).

4. An image processing method, comprising:

setting, by an image processing apparatus, a reference range within a picture for detection of a motion vector of a current block within the picture, wherein a boundary region, within a first region of the picture, is excluded from the reference range for prediction of the current block, the boundary region is along a boundary between the first region and an entirety of a second region in the picture, and the first region is an encoded region and the second region is a non-encoded region;

detecting, by the image processing apparatus, the motion vector of the current block within the picture based on the reference range;

predicting, by the image processing apparatus, the current block based on the detected motion vector and a correlativity in the picture, wherein one of a horizontal distance of the boundary region or a vertical distance of the boundary region from the non-encoded region is within a specific range, and the specific range is within three pixels; and predicting the current block after a deblock filter process and a Sample Adaptive Offset (SAO) process.

* * * * *